United States Patent
Takamoto et al.

(10) Patent No.: US 9,441,083 B2
(45) Date of Patent: Sep. 13, 2016

(54) FUNCTIONAL POLYMER MEMBRANE AND METHOD OF PRODUCING THE SAME

(71) Applicant: FUJIFILM Corporation, Tokyo (JP)

(72) Inventors: Tetsufumi Takamoto, Kanagawa (JP); Akihito Amao, Kanagawa (JP); Wakana Yamada, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/669,990

(22) Filed: Mar. 26, 2015

(65) Prior Publication Data

US 2015/0259488 A1 Sep. 17, 2015

Related U.S. Application Data

(63) Continuation of application No. PCT/JP2013/076114, filed on Sep. 26, 2013.

(30) Foreign Application Priority Data

Sep. 28, 2012 (JP) .................................. 2012-218751
Sep. 28, 2012 (JP) .................................. 2012-218752

(51) Int. Cl.
  *C08J 5/22* (2006.01)
  *C08J 5/18* (2006.01)
  (Continued)

(52) U.S. Cl.
  CPC ............ *C08J 5/2231* (2013.01); *B01D 53/228* (2013.01); *B01D 61/002* (2013.01); *B01D 61/02* (2013.01);
  (Continued)

(58) Field of Classification Search
  CPC ............ C08J 5/2231; C08J 5/18; C08J 5/22; B01J 39/20; B01J 41/14; B01J 47/12; B01D 71/40; B01D 71/82; B01D 67/006; B01D 69/125; B01D 61/00; B01D 61/02; C08F 220/58

USPC ....................................................... 521/27, 31
See application file for complete search history.

(56) References Cited

U.S. PATENT DOCUMENTS

2010/0210160 A1   8/2010 Hester et al.

FOREIGN PATENT DOCUMENTS

JP    2005-353534 A    12/2005
JP    2007-031372 A     2/2007
(Continued)

OTHER PUBLICATIONS

Communication dated Sep. 29, 2015 from the Japanese Patent Office in counterpart application No. 2012-218751.
(Continued)

*Primary Examiner* — Michael M Bernshteyn
(74) *Attorney, Agent, or Firm* — Sughrue Mion, PLLC

(57) ABSTRACT

A functional polymer membrane, prepared by curing a composition comprising a polymerizable compound (A) represented by Formula (1) and a monofunctional polymerizable compound (B):

Formula (1)

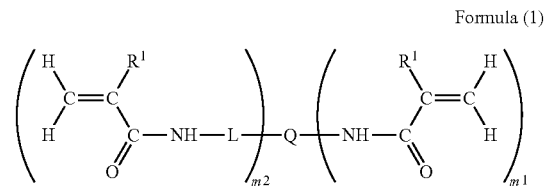

wherein $R^1$ represents a hydrogen atom or a methyl group; Q represents a polyol residue formed by removing m2 hydrogen atoms from hydroxyl groups of a trivalent to hexavalent polyol; L represents a divalent linking group; m1 represents 0 or 1; m2 represents an integer of from 3 to 6, and wherein the monofunctional polymerizable compound (B) is a (meth)acrylate compound, a (meth)acrylamide compound, a vinyl ether compound, an aromatic vinyl compound, an N-vinyl compound, or an allyl compound.

19 Claims, 2 Drawing Sheets

(51) Int. Cl.
| | |
|---|---|
| *B01J 39/20* | (2006.01) |
| *B01J 41/14* | (2006.01) |
| *B01J 47/12* | (2006.01) |
| *B01D 71/40* | (2006.01) |
| *B01D 71/82* | (2006.01) |
| *C08F 220/58* | (2006.01) |
| *B01D 67/00* | (2006.01) |
| *B01D 69/12* | (2006.01) |
| *B01D 53/22* | (2006.01) |
| *B01D 61/00* | (2006.01) |
| *B01D 61/02* | (2006.01) |
| *B01D 61/44* | (2006.01) |
| *B01D 71/60* | (2006.01) |
| *C08F 220/38* | (2006.01) |

(52) U.S. Cl.
CPC ........... *B01D 61/44* (2013.01); *B01D 67/0006* (2013.01); *B01D 67/006* (2013.01); *B01D 69/125* (2013.01); *B01D 71/40* (2013.01); *B01D 71/60* (2013.01); *B01D 71/82* (2013.01); *B01J 39/20* (2013.01); *B01J 41/14* (2013.01); *B01J 47/12* (2013.01); *C08F 220/58* (2013.01); *C08J 5/18* (2013.01); *C08J 5/22* (2013.01); *B01D 2325/30* (2013.01); *C08F 2220/382* (2013.01); *C08J 2333/24* (2013.01); *C08J 2333/26* (2013.01); *C08J 2335/00* (2013.01); *C08L 2312/00* (2013.01)

(56) References Cited

FOREIGN PATENT DOCUMENTS

| | | | |
|---|---|---|---|
| JP | 2007-035599 A | | 2/2007 |
| JP | 2007031372 A | * | 2/2007 |
| JP | 2007035599 A | * | 2/2007 |
| WO | 2008/112952 A1 | | 9/2008 |
| WO | 2011/025867 A1 | | 3/2011 |
| WO | 2011/073637 A1 | | 6/2011 |
| WO | 2011/073638 A1 | | 6/2011 |
| WO | 2012/133182 A1 | | 10/2012 |
| WO | 2013/008626 A1 | | 1/2013 |

OTHER PUBLICATIONS

Communication dated Sep. 29, 2015 from the Japanese Patent Office in counterpart application No. 2012-218752.

International Search Report for PCT/JP2013/076114 dated Nov. 12, 2013.

Communication dated Jan. 7, 2016 from the European Patent Office in counterpart application No. 13840210.2.

* cited by examiner

FUNCTIONAL POLYMER MEMBRANE AND METHOD OF PRODUCING THE SAME

CROSS-REFERENCE TO RELATED APPLICATIONS

This application is a Continuation of PCT International Application No. PCT/JP2013/076114 filed on Sep. 26, 2013, which claims priority under 35 U.S.C. §119 (a) to Japanese Patent Application No. 2012-218751 filed on Sep. 28, 2012, and Japanese Patent Application No. 2012-218752 filed on Sep. 28, 2012. Each of the above applications is hereby expressly incorporated by reference, in its entirety, into the present application.

FIELD OF THE INVENTION

The present invention relates to a functional polymer membrane useful for an ion exchange membrane, a reverse osmosis membrane, a forward osmosis membrane, a gas separation membrane and the like; and a method of producing them.

BACKGROUND OF THE INVENTION

As a functional polymer membrane, an ion exchange membrane, a reverse osmosis membrane, a forward osmosis membrane, a gas separation membrane and the like are known as membranes having various kinds of functions.

For example, the ion exchange membrane is used in electrodeionization (EDI), continuous electrodeionization (CEDI), electrodialysis (ED), electrodialysis reversal (EDR) and the like.

The electrodeionization (EDI) is a water treatment process wherein ions are removed from aqueous liquids using an ion exchange membrane and an electrical potential to effect ion transport. It differs from other water purification technologies, such as conventional ion exchange, in that it is does not require the use of chemicals such as acids or caustic soda. EDI can be used to produce ultra pure water. The electrodialysis (ED) and the electrodialysis reversal (EDR) are electrochemical separation processes that remove ions and the like from water and other fluids.

In the ion exchange membrane, study on improvement in ionic transport number and pH tolerance has been conducted (for example, see Patent Literature 1 to 3). However, further improvement in performance as the functional polymer membrane has been required, and improvement in characteristics of the functional polymer membrane other than the above has also been demanded.

CITATION LIST

Patent Literatures

Patent Literature 1: WO 2011/073637 A1
Patent Literature 2: WO 2011/073638 A1
Patent Literature 3: WO 2011/025867 A1

SUMMARY OF THE INVENTION

Problems that the Invention is to Solve

Study by the present inventors revealed that a conventional functional polymer membrane has room for allowing further improvement in, for example, pH tolerance, and in order to significantly enhance use as the functional polymer membrane, further reduction of water permeability is important.

The present invention is contemplated for providing a functional polymer membrane that can be used in wide applications, and is excellent in suppression of water permeability, and pH tolerance without reducing transport number of various kinds of substances, and a method of producing the same. Above all, in particular, the present invention is contemplated for providing, as an ion exchange membrane, a functional polymer membrane that is excellent in suppression of water permeability, ionic transport number and pH tolerance.

Means to Solve the Problem

In view of the above-described situation, the present inventors have diligently conducted study on a polymerizable compound suitable for a functional polymer membrane. As a result, the present inventors have found that a functional polymer membrane prepared using a polyfunctional polymerizable compound having a structure represented by Formula (1) shows not only good ionic transport number and pH tolerance but also good low water permeability upon using as an ion exchange membrane. The present invention has been completed based on the findings above.

The above-described problems of the present invention were solved by the following means.

<1> A functional polymer membrane, prepared by curing a composition containing a polymerizable compound (A) represented by Formula (1) and a monofunctional polymerizable compound (B):

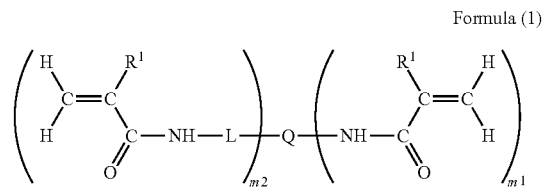

Formula (1)

wherein $R^1$ represents a hydrogen atom or a methyl group; Q represents a polyol residue formed by removing m2 hydrogen atoms from hydroxyl groups of a trivalent to hexavalent polyol; L represents a divalent linking group; m1 represents 0 or 1; m2 represents an integer of from 3 to 6; when m1 is 0, L represents —$CH_2CH_2CH_2$—; when m1 is 1, m2 is 3, Q represents a polyol residue formed by removing three hydrogen atoms from hydroxyl groups of a trivalent polyol *-C($L^2$-OH)$_3$, and L represents —$(C_kH_{2k}O)_l$-$L^1$-; the symbol "*" represents a binding site to nitrogen atom of (meth)acrylamide; $L^2$ represents a divalent linking group; k represents 2 or 3; l represents an integer of from 0 to 6; $L^1$ represents a linear or branched alkylene group having 2 to 4 carbon atoms and bonded to the nitrogen atom of the (meth)acrylamide; in $L^1$, the oxygen atom and nitrogen atom bonded to both ends of $L^1$ do not bind to the same carbon atom of $L^1$; and the sum of the three l's satisfies from 0 to 18.

<2> The functional polymer membrane described in the above item <1>, wherein the polymerizable compound (A) represented by Formula (1) is a polymerizable compound represented by Formula (2):

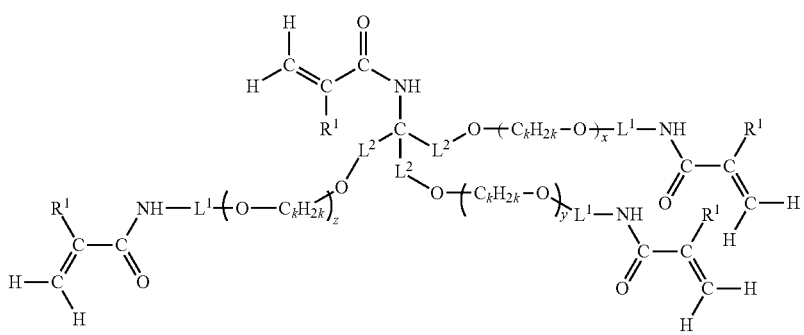

Formula (2)

wherein $R^1$ represents a hydrogen atom or a methyl group; $L^1$ represents a linear or branched alkylene group having 2 to 4 carbon atoms; in $L^1$, the oxygen atom and nitrogen atom bonded to both ends of $L^1$ do not bind to the same carbon atom of $L^1$; $L^2$ represents a divalent linking group; k represents 2 or 3; x, y and z each independently represent an integer of from 0 to 6; and (x+y+z) satisfies from 0 to 18.

<3> The functional polymer membrane described in the above item <1>, wherein the polymerizable compound (A) represented by Formula (1) is a polymerizable compound represented by Formula (3):

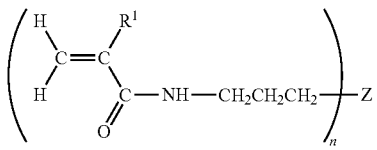

Formula (3)

wherein $R^1$ represents a hydrogen atom or a methyl group; Z represents a polyol residue formed by removing n hydrogen atoms from hydroxyl groups of a trivalent to hexavalent polyol; and n represents an integer of from 3 to 6.

<4> The functional polymer membrane described in the above item <3>, wherein Z in Formula (3) represents a polyol residue formed by removing n hydrogen atoms from hydroxyl groups of glycerin, erythritol, xylitol, mannitol, sorbitol, pentaerythritol or dipentaerythritol.

<5> The functional polymer membrane described in any one of the above items <1> to <4>, wherein the copolymerizable monomer (B) has a dissociative group.

<6> The functional polymer membrane described in the above item <5>, wherein the dissociative group is selected from the group consisting of a sulfo group or a salt thereof, a carboxy group or a salt thereof, an ammonio group and a pyridinio group.

<7> The functional polymer membrane described in any one of the above items <1> to <6>, wherein the copolymerizable monomer (B) is a (meth)acrylate compound or a (meth)acrylamide compound.

<8> The functional polymer membrane described in any one of the above items <3> to <7>, wherein a content of the polymerizable compound (A) represented by Formula (3) in the composition is 1 to 40% by mass.

<9> The functional polymer membrane described in any one of the above items <2> and <5> to <8>, wherein a content of the polymerizable compound (A) represented by Formula (2) is 1 to 45 parts by mass based on 100 parts by mass of the monofunctional polymerizable compound (B).

<10> The functional polymer membrane described in any one of the above items <3> to <9>, wherein a content of the polymerizable compound (A) represented by Formula (3) is 10 to 200 parts by mass based on 100 parts by mass of the monofunctional polymerizable compound (B).

<11> The functional polymer membrane described in any one of the above items <1> to <10>, wherein the composition contains a solvent (E).

<12> The functional polymer membrane described in the above item <11>, wherein the solvent (E) is selected from water and a water-soluble solvent.

<13> The functional polymer membrane described in the above item <11> or <12>, wherein a content of the solvent (E) in the composition is 10 to 50% by mass.

<14> The functional polymer membrane described in any one of the above items <1> to <13>, which contains a support.

<15> The functional polymer membrane described in any one of the above items <1> to <14>, prepared by curing the composition after being impregnated into the support.

<16> The functional polymer membrane described in any one of the above items <1> to <15>, wherein the functional polymer membrane is an ion exchange membrane, a reverse osmosis membrane, a forward osmosis membrane, or a gas separation membrane.

<17> A method of producing a functional polymer membrane, containing the step of: irradiating a composition containing a polymerizable compound (A) represented by Formula (1) and a monofunctional polymerizable compound (B) with an energy ray thereby polymerizing the composition:

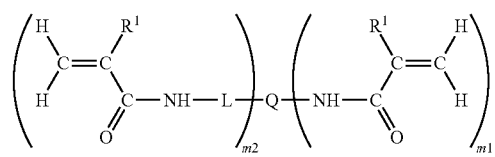

Formula (1)

wherein $R^1$ represents a hydrogen atom or a methyl group; Q represents a polyol residue formed by removing m2 hydrogen atoms from hydroxyl groups of a trivalent to hexavalent polyol; L represents a divalent linking group; m1 represents 0 or 1; m2 represents an integer of from 3 to 6; when m1 is 0, L represents —$CH_2CH_2CH_2$—; when m1 is 1, m2 is 3, Q represents a polyol residue formed by removing three hydrogen atoms from hydroxyl groups of a trivalent polyol *—C(L²—OH)₃, and L represents —(C$_k$H$_{2k}$O)$_l$-L¹-; the symbol "*" represents a binding site to the nitrogen atom of the (meth)acrylamide; L² represents a divalent linking group; k represents 2 or 3; l represents an integer of from 0 to 6; L¹ represents a linear or branched alkylene group having 2 to 4 carbon atoms and bonded to nitrogen atom of (meth)acrylamide; in L¹, the oxygen atom and nitrogen atom bonded to both ends of L¹ do not bind to the same carbon atom of L¹; and the sum of the three l's satisfies from 0 to 18.

<18> The method of producing a functional polymer membrane described in the above item <17>, wherein the polymerizable compound represented by Formula (1) is a polymerizable compound represented by Formula (2):

Moreover, the description "(meth)acrylamide" represents acrylamide and/or methacrylamide, and the description "(meth)acrylate" represents acrylate and/or methacrylate.

Moreover, in each formula, unless otherwise noted, when a plurality of groups having identical signs exist, these groups may be identical with or different from each other, and in a similar manner, when repetition of a plurality partial structure exists, the repetition means both of repetition of identical partial structure and mixture of repetition of different partial structure in a specified range.

Further, in a geometrical isomer being a substitution pattern around a double bond in each formula, for convenience of a display, even if one of the isomers is described, unless otherwise noted, the isomer may as well include an E isomer, a Z isomer or a mixture of these isomers.

Formula (2)

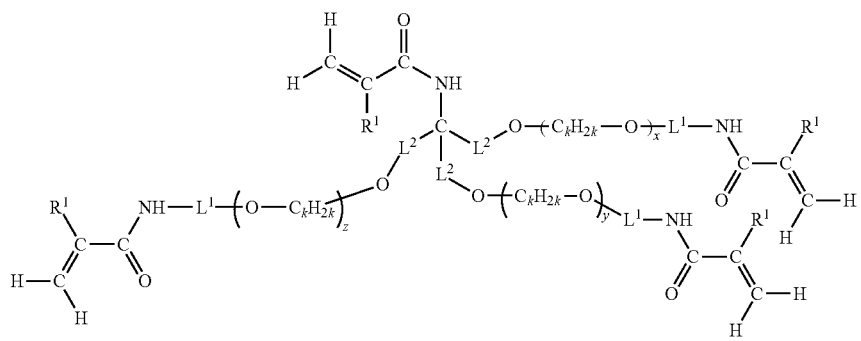

wherein R¹ represents a hydrogen atom or a methyl group; L¹ represents a linear or branched alkylene group having 2 to 4 carbon atoms; in L¹, the oxygen atom and nitrogen atom bonded to both ends of L¹ do not bind to the same carbon atom of L¹; L² represents a divalent linking group; k represents 2 or 3; x, y and z each independently represent an integer of from 0 to 6; and (x+y+z) satisfies from 0 to 18.

<19> The method of producing a functional polymer membrane described in the above item <17>, wherein the polymerizable compound (A) represented by Formula (1) is a polymerizable compound represented by Formula (3):

Formula (3)

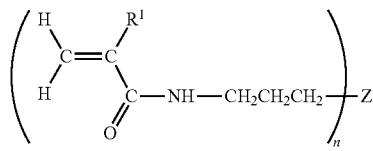

wherein R¹ represents a hydrogen atom or a methyl group; Z represents a polyol residue formed by removing n hydrogen atoms from hydroxyl groups of a trivalent to hexavalent polyol; and n represents an integer of from 3 to 6.

In addition, in the present specification, the description "to" is used as the meaning which includes the numerical values which are written before and after thereof as the lower limit value and the upper limit value. Moreover, the term "dissociative group" means a group that is reversibly dissociable into and associable from a component atom, an ion, an atomic group or the like.

In the present invention, the term "(meth)acryl" is used to mean —C(=O)CH=CH₂ and/or —C(=O)C(CH₃)=CH₂.

In the present specification, when a substance is named by placing a word "compound" in the end, or when a specific compound is presented by a name or a formula thereof, the name or the formula is used in the meaning of the compound per se, and also a substance including a salt or ions thereof if the relevant substance has dissociable partial structure in a chemical structure formula thereof. Further, in the present specification, when, with respect to the substituent, a specific group of atoms is called by putting the term "group" at the foot of the specific group of atoms, or a specific compound is called by its name, it means that the group or the compound may further have an arbitrary substituent.

Effects of the Invention

The present invention can provide a functional polymer membrane that is excellent in suppression of water permeability, and pH tolerance. The present invention can also provide a functional polymer membrane that is excellent in all of suppression of water permeability, ionic transport number and pH tolerance, being main properties as an ion exchange membrane.

Other and further features and advantages of the invention will appear more fully from the following description, appropriately referring to the accompanying drawings.

MODE FOR CARRYING OUT THE INVENTION

Figure 1:
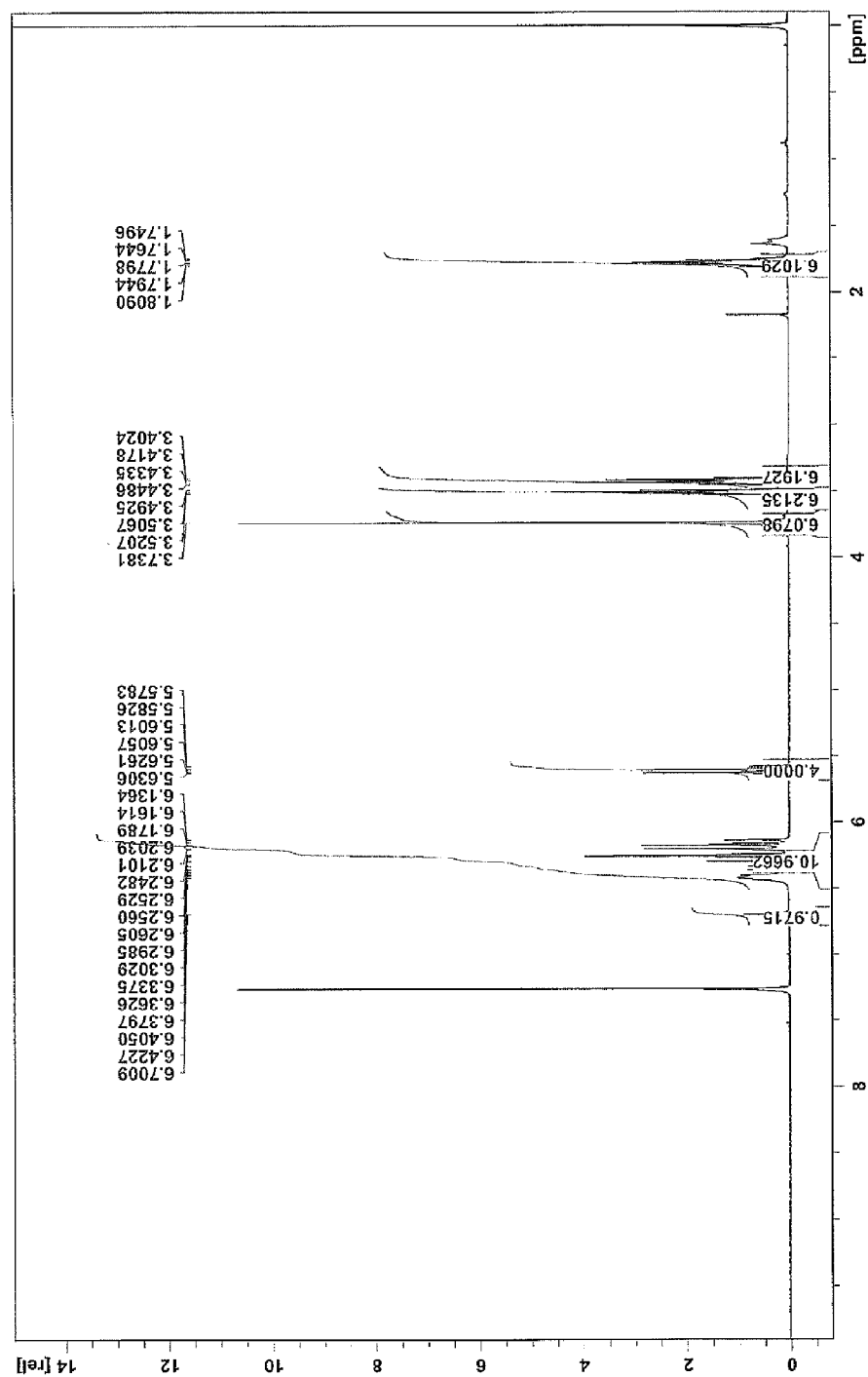
FIG. 1 is a ¹H-NMR spectrum chart of the following polymerizable compound 1.

A functional polymer membrane (hereinafter, simply referred to as "membrane" in several cases) according to the present invention is formed by carrying out a reaction of curing of a composition containing as essential components a polymerizable compound (A) represented by Formula (1) and a monofunctional polymerizable compound (B), and when necessary, further containing a polymerization initiator (C), a polymerization inhibitor (D), a solvent (E) and so forth.

The functional polymer membrane of the present invention can be used for performing ion exchange, reverse osmosis, forward osmosis, gas separation or the like. A preferred embodiment of the present invention will be described below by taking as an example in a case where the above-described functional polymer membrane has a function as an ion exchange membrane.

The functional polymer membrane of the present invention preferably include an anion exchange membrane or a cation exchange membrane.

When the membrane has a support, a thickness of the membrane is preferably, including the support, less than 1,000 μm, further preferably, 10 to 300 μm, and most preferably, 20 to 200 μm.

The functional polymer membrane of the present invention has an ion exchange capacity of, preferably, 0.3 meq/g or more, further preferably, 0.5 meq/g or more, still further preferably, 0.8 meq/g or more, particularly preferably, 1.0 meq/g or more, and most preferably, 1.2 meq/g or more, based on the total dry mass of the membrane, an arbitrary porous support that is continuously brought into contact with the resultant membrane, and a porous support and an arbitrary reinforcing material included in the membrane. The upper limit of the ion exchange capacity is not particularly limited, but it is practically 5.0 meq/g or less. Herein, the term "meq" stands for milliequivalent.

Ionic permselectivity (ionic transport number) to the ions (an anion such as in the case of the anion exchange membrane) in the functional polymer membrane according to the present invention exceeds preferably 0.8, further preferably, 0.85, still further preferably, 0.9, particularly preferably, 0.95, and most preferably, is near 1 being a theoretical value. Ionic permselectivity to the ions (a cation such as $Na^+$ in the case of the cation exchange membrane) in the functional polymer membrane according to the present invention exceeds preferably 0.8, further preferably, 0.85, still further preferably, 0.9, particularly preferably, 0.95, and most preferably, is near 1 being a theoretical value.

The functional polymer membrane of the present invention preferably has an electrical resistance (membrane resistance) less than 10 $\Omega \cdot cm^2$, more preferably less than 5 $\Omega \cdot cm^2$, and most preferably less than 3 $\Omega \cdot cm^2$. The electrical resistance is preferably as low as possible, and preferably adjusted to a lowest value in a range that can be achieved on exhibiting an advantageous effect of the present invention. The lower limit of electrical resistance is not particularly limited, but is practically 0.1 $\Omega \cdot cm^2$ or more.

A swelling ratio of the functional polymer membrane according to the present invention in water is preferably less than 30%, more preferably less than 15%, and most preferably, less than 8%. The lower limit of the swelling ratio is not particularly limited, but is preferably 2.0% or more. The swelling ratio can be controlled by selecting a proper parameter such as a degree of cure and a degree of polymerization in a curing stage.

The water uptake of the functional polymer membrane of the present invention is preferably less than 70%, more preferably less than 50%, and especially preferably less than 40%, based on mass of dry membrane. The lower limit of the water uptake is not particularly limited, but it is practically 10% or more.

In addition, the electrical resistance of the membrane, the ionic permselectivity thereof and the swelling ratio % thereof in water can be measured by the methods described in Membrane Science, 319, pp. 217-218 (2008), and Experimental method in membrane science, pp. 193-195 (1984), authored by Masayuki Nakagaki.

The water permeability of the functional polymer membrane of the present invention is preferably $20 \times 10^{-5}$ mL/m²/Pa/hr or less, more preferably $15 \times 10^{-5}$ mL/m²/Pa/hr or less, further preferably $14 \times 10^{-5}$ mL/m²/Pa/hr or less, especially preferably $12 \times 10^{-5}$ mL/m²/Pa/hr or less, and most preferably $10 \times 10^{-5}$ mL/m²/Pa/hr. The lower limit of the water permeability is not particularly limited, but it is practically 2.0 mL/m²/Pa/hr or more.

Typically, the functional polymer membrane of the present invention is substantially non-porous e.g. the pores are smaller than the detection limit of a standard Scanning Electron Microscope (SEM). Thus, using a Jeol JSM-6335F Field Emission SEM (applying an accelerating voltage of 2 kV, working distance 4 mm, aperture 4, sample coated with Pt with a thickness of 1.5 nm, magnification 100,000 times, 3° tilted view), the average pore size is usually smaller than 5 nm.

Next, each component contained in the composition (hereinafter, also referred to as "composition of the present invention") for forming the functional polymer membrane according to the present invention will be described below.
<Components>
Polymerizable Compound (A) Represented by Formula (1)

The functional polymer membrane of the present invention is formed by curing the composition containing the polymerizable compound represented by Formula (1).

The polymerizable compound represented by Formula (1) has an acrylamide group(s) and/or a methacrylamide group(s) as a polymerizable group in its molecule and has high polymerizing ability and curing ability and is excellent in pH tolerance and mechanical strength, too. Furthermore, the polymerizable compound is easily polymerized by giving an active energy ray such as α-rays, γ-rays, X-rays, ultraviolet rays, visible light, infrared light or an electron beam, or energy such as heat, and thus a polymer membrane can be obtained. In addition, the compound represented by Formula (1) shows water-solubility and is favorably dissolved in water or a water-soluble organic solvent such as alcohol.

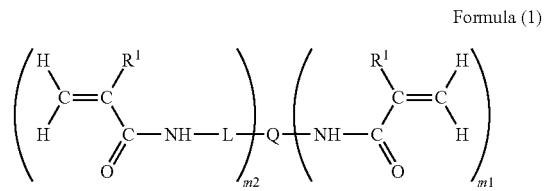

Formula (1)

wherein $R^1$ represents a hydrogen atom or a methyl group; Q represents a polyol residue formed by removing m2 hydrogen atoms from hydroxyl groups of a trivalent to hexavalent polyol; L represents a divalent linking group; m1 represents 0 or 1; m2 represents an integer of from 3 to 6;

when m1 is 0, L represents —CH$_2$CH$_2$CH$_2$—; when m1 is 1, m2 is 3, Q represents a polyol residue formed by removing three hydrogen atoms from hydroxyl groups of a trivalent polyol *—C(L$^2$—OH)$_3$, and L represents —(C$_k$H$_{2k}$O)$_l$-L$^1$-; the symbol "*" represents a binding site to the nitrogen atom of the (meth)acrylamide; L$^2$ represents a divalent linking group; k represents 2 or 3; l represents an integer of from 0 to 6; L$^1$ represents a linear or branched alkylene group having 2 to 4 carbon atoms and bonded to the nitrogen atom of the (meth)acrylamide; in L$^1$, the oxygen atoms and nitrogen atoms bonded to both ends of L$^1$ do not bind to the same carbon atom of L$^1$; and the sum of the three l's satisfies from 0 to 18.

In the present invention, the polymerizable compound (A) represented by Formula (1) is preferably a polymerizable compound represented by Formula (2).

Examples of the divalent linking group represented by L$^2$ include an alkylene group, an arylene group, a divalent heterocyclic group, and a group formed of a combination of these. Of these, an alkylene group is preferable. Herein, in a case where the divalent linking group contains an alkylene group, at least one selected from —O—, —S— and —N(Ra)— may be further contained in the alkylene group. Herein, Ra represents a hydrogen atom or an alkyl group having 1 to 4 carbon atoms.

In addition, an expression "—O— is contained in the alkylene groups" means that the alkylene groups in a linking chain of the linking group are linked through the above-described hetero atom, such as -alkylene-O-alkylene-.

Specific examples of the alkylene group containing —O— include —C$_2$H$_4$—O—C$_2$H$_4$—, and —C$_3$H$_6$—O—C$_3$H$_6$—.

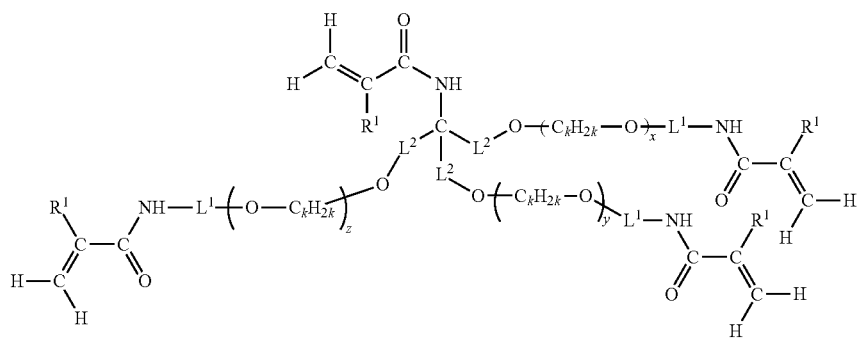

Formula (2)

In Formula (2), R$^1$, L$^1$, L$^2$ and k have the same meaning as R$^1$, L$^1$, L$^2$ and k in Formula (1), respectively. x, y and z each independently represent an integer of from 0 to 6; and (x+y+z) satisfies from 0 to 18

R$^1$ represents a hydrogen atom or a methyl group. In Formula (1), plural R$^1$'s may be the same as or different from each other. R$^1$ is preferably a hydrogen atom.

In Formula (1), L$^1$ represents a linear or branched alkylene group having 2 to 4 carbon atoms. Plural L$^1$'s may be the same as or different from each other. The number of carbon atoms of the alkylene group of L$^1$ is preferably 3 or 4, more preferably 3. Of these, a linear alkylene group having 3 carbon atoms is particularly preferable. The alkylene group of L$^1$ may further have a substituent. Examples of the substituent include an aryl group, an alkoxy group, and the like.

However, in L$^1$, the oxygen atoms and nitrogen atoms bonded to both ends of the L$^1$ do not have a structure which is bonded to the same carbon atom of L$^1$. L$^1$ is a linear or branched alkylene group linking the oxygen atom and the nitrogen atom of the (meth)acrylamide group. Herein, in a case where the alkylene group has a branched structure, it is considered that the oxygen atom and the nitrogen atom of the (meth)acrylamide group at both ends bond to the same carbon atom in the alkylene group, and take the —O—C—N— structure (hemiaminal structure). However, the polymerizable compound represented by Formula (1) for use in the present invention does not include a compound of such a structure. When the compound has the —O—C—N— structure in the molecule, degradation easily occurs at the position of the carbon atom. In particular, such a compound is easily decomposed during storage, and the decomposition is accelerated in the presence of water or moisture to reduce storage stability of the composition of the present invention.

When L$^2$ contains an alkylene group, examples of the alkylene group include methylene, ethylene, propylene, butylene, pentylene, hexylene, heptylene, octylene, and nonylene. The number of carbon atoms of the alkylene group of L$^2$ is preferably 1 to 6, further preferably 1 to 3, and particularly preferably 1. This alkylene group may further have a substituent. Examples of the substituent include an aryl group and an alkoxy group.

When L$^2$ contains an arylene group, examples of the arylene group include phenylene and naphthylene. The number of carbon atoms of the arylene group is preferably 6 to 14, further preferably 6 to 10, and particularly preferably 6. This arylene group may further have a substituent. Examples of the substituent include an alkyl group and an alkoxy group.

When L$^2$ contains a divalent heterocyclic group, this heterocyclic group is preferably a 5-membered or 6-membered ring, and may be condensed. In addition, the ring may be an aromatic heterocycle or a non-aromatic heterocycle. Examples of the heterocycle of the divalent heterocyclic group include pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isoxazole, benzisoxazole, pyrrolidine, piperidine, piperazine, imidazolidine, and thiazoline. Among them, an aromatic heterocycle is preferable; and pyridine, pyrazine, pyrimidine, pyridazine, triazine, pyrazole, imidazole, benzimidazole, triazole, thiazole, benzothiazole, isothiazole, benzisothiazole, and thiadiazole is preferable.

Positions of two bonding hands of the heterocycle of the divalent heterocyclic group are not particularly limited. For example, for pyridine, substitution can be made in 2-position, 3-position and 4-position, and the two bonding hands may as well be in any position.

The heterocycle of the divalent heterocyclic group may have further a substituent. Examples of the substituent include an alkyl group, an aryl group, and an alkoxy group.

k represents 2 or 3. Plural k's may be the same as or different from each other. In addition, $C_kH_{2k}$ may be a linear structure or a branched structure.

x, y and z each independently represent an integer of from 0 to 6, preferably an integer of from 0 to 5, and more preferably an integer of from 0 to 3. (x+y+z) satisfies from 0 to 18, preferably satisfies from 0 to 15, and more preferably satisfies from 0 to 9.

Examples of the polymerizable compound represented by Formula (2) are described below. However, the present invention is not limited thereto.

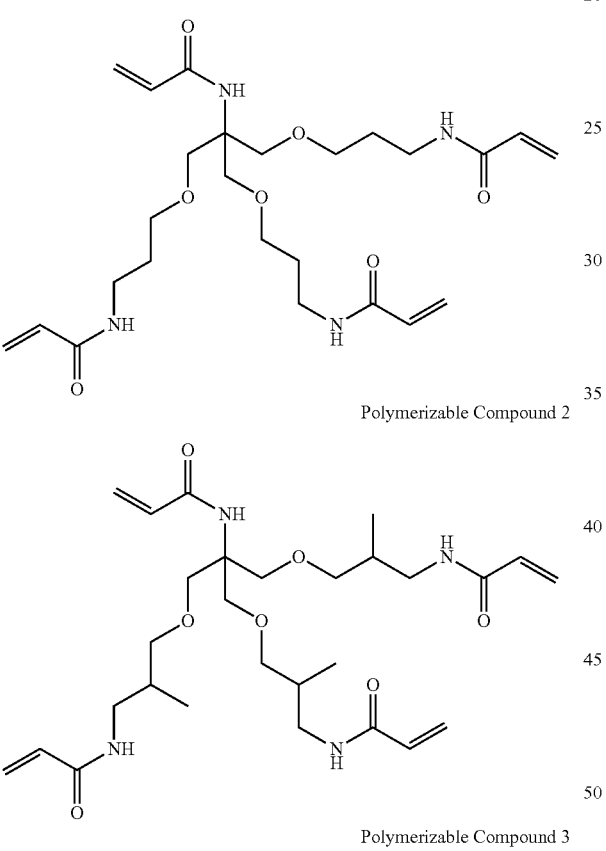

Polymerizable Compound 1

Polymerizable Compound 2

Polymerizable Compound 3

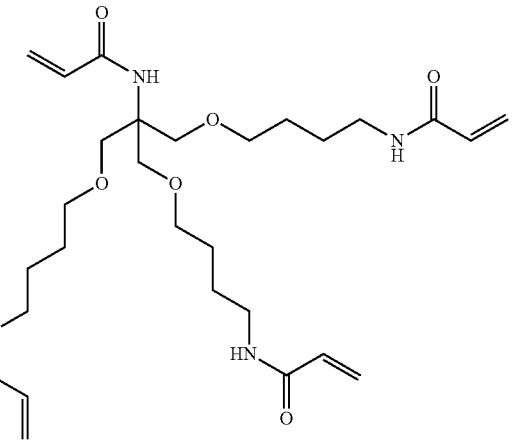

Polymerizable Compound 4

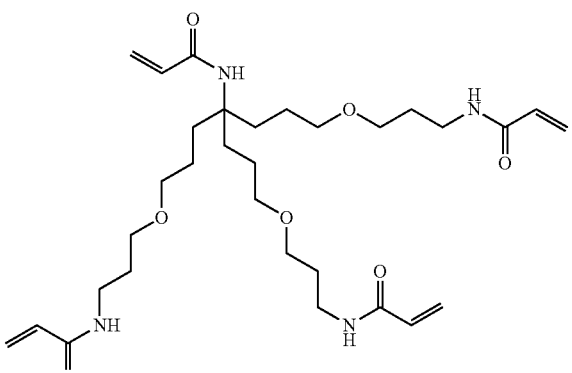

Polymerizable Compound 5

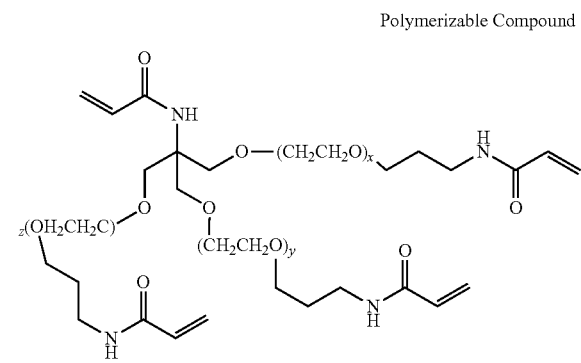

Polymerizable Compound 6

$x + y + z = 9$

The polymerizable compound represented by Formula (2) can be prepared according to, for example, the following scheme 1 or scheme 2. In the functional polymer membrane of the present invention, the compound represented by Formula (2) may be used in combination of two or more kinds thereof. Moreover, the compound represented by Formula (2) may be used in combination with a polymerizable compound represented by Formula (3) as described later.

Scheme 1

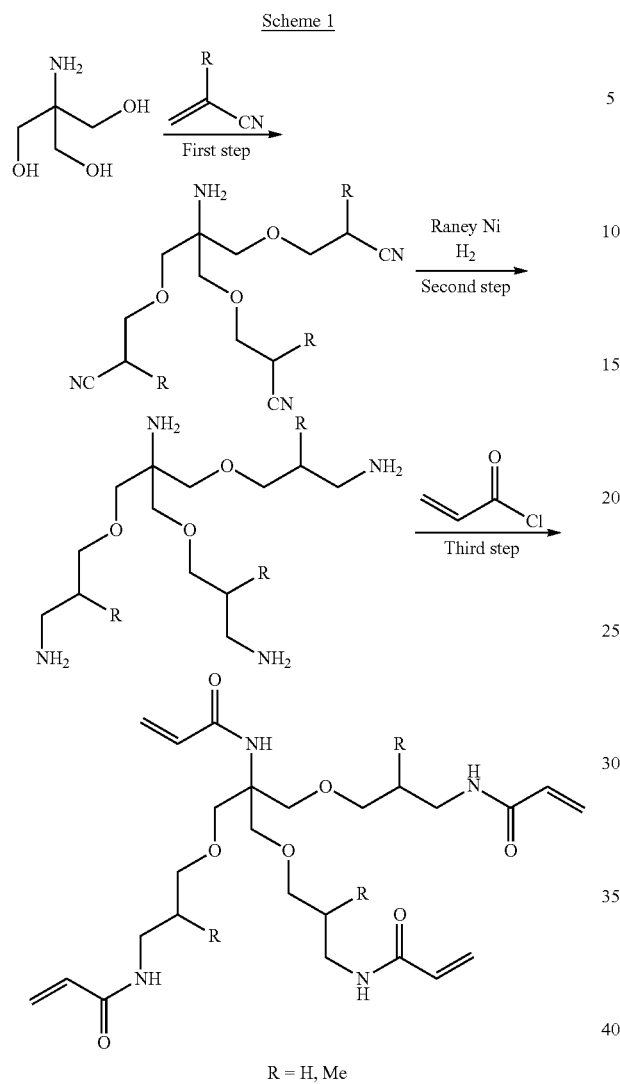

R = H, Me

Scheme 2

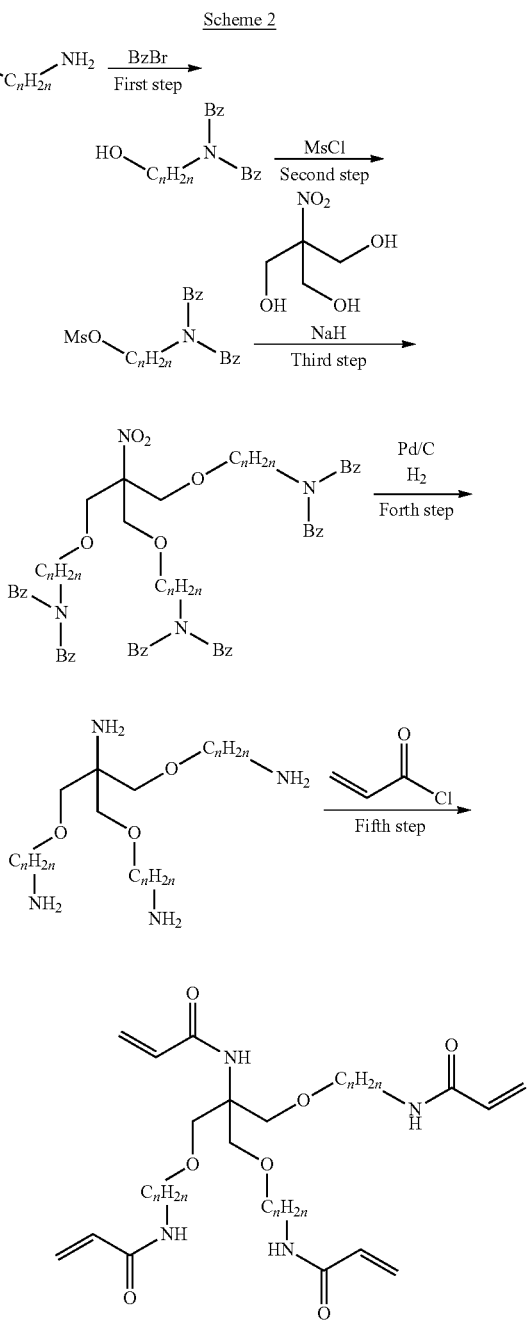

Scheme 1
(First step) The first step is a step of obtaining a polycyano compound by a reaction of acrylonitrile and trishydroxymethylaminomethane. The reaction in this step is preferably carried out at the temperature of 3 to 60° C. for 2 to 8 hours.
(Second step) The second step is a step of reacting the polycyano compound with hydrogen in the presence of a catalyst and obtaining a polyamine compound by a reduction reaction. The reaction in this step is preferably carried out at the temperature of 20 to 60° C. for 5 to 16 hours.
(Third step) The third step is a step of obtaining a polyfunctional acrylamide compound by an acylating reaction of the polyamine compound, and acrylic acid chloride or methacrylic acid chloride. The reaction in this step is preferably carried out at the temperature of 3 to 25° C. for 1 to 5 hours. Herein, instead of acrylic acid chloride, the acylating agent may use diacrylate anhydride or dimethacrylic anyhydride. Herein, in the acylation step, by using both acrylic acid chloride and methacrylic acid chloride, it is possible to obtain a compound having an acrylamide group and methacrylamide group in the same molecule as the final product.

Herein, "Bz" represents a benzyl group, and "Ms" represents a methanesulfonyl group.
Scheme 2
(First step) The first step is a step of obtaining a nitrogen-protected amino alcohol compound by a protective group introduction reaction according to a benzyl group, a benzyloxycarbonyl group or the like in a nitrogen atom of an amino alcohol. The reaction in this step is preferably carried out at the temperature of 3 to 25° C. for 3 to 5 hours.
(Second step) The second step is a step of introducing a leaving group such as a methanesulfonyl group and a p-toluenesulfonyl group into an OH group of the nitrogen-protected amino alcohol compound to obtain a sulfonyl compound. The reaction in this step is preferably carried out at the temperature of 3 to 25° C. for 2 to 5 hours.

(Third step) The third step is a step of obtaining an amino alcohol adduct compound by an $S_N2$ reaction of the sulfonyl compound and tris hydroxymethyl nitro methane. The reaction in this step is preferably carried out at the temperature of 3 to 70° C. for 5 to 10 hours.

(Forth step) The forth step is a step of reacting the amino alcohol adduct compound with hydrogen in the presence of a catalyst and obtaining a polyamine compound by a hydrogenation reaction. The reaction in this step is preferably carried out at the temperature of 20 to 60° C. for 5 to 16 hours.

(Fifth step) The fifth step is a step of obtaining a polyfunctional acrylamide compound by an acylating reaction of the polyamine compound, and acrylic acid chloride or methacrylic acid chloride. The reaction in this step is preferably carried out at the temperature of 3 to 25° C. for 1 to 5 hours. Herein, instead of (meth)acrylic acid chloride, the acylating agent may use diacrylate anhydride or dimethacrylic anhydride. Herein, in the acylation step, by using both acrylic acid chloride and methacrylic acid chloride, it is possible to obtain a compound having an acrylamide group and methacrylamide group in the same molecule as the final product.

The compound obtained through the above-described steps can be obtained by purification of the reaction product solution by a usual method. For example, it is possible to perform purification by liquid separation and extraction using an organic solvent, crystallization using a poor solvent, column chromatography using silica gel, or the like.

In the present invention, the polymerizable compound (A) represented by Formula (1) is preferably, as well as the polymerizable compound represented by Formula (2), a polymerizable compound represented by Formula (3).

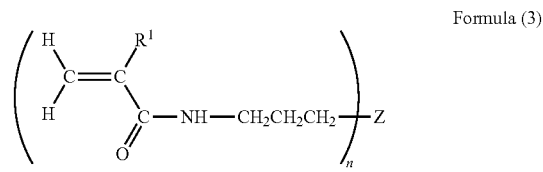

Formula (3)

In Formula (3), $R^1$ represents a hydrogen atom or a methyl group; Z represents a polyol residue formed by removing n hydrogen atoms from hydroxyl groups of a trivalent to hexavalent polyol; and n represents an integer of from 3 to 6.

Z in Formula (3) represents a polyol residue formed by removing n hydrogen atoms from hydroxyl groups of glycerin, erythritol, xylitol, mannitol, sorbitol, pentaerythritol or dipentaerythritol.

Examples of the polymerizable compound represented by Formula (3) are described below. However, the present invention is not limited thereto.

Polymerizable Compound 7

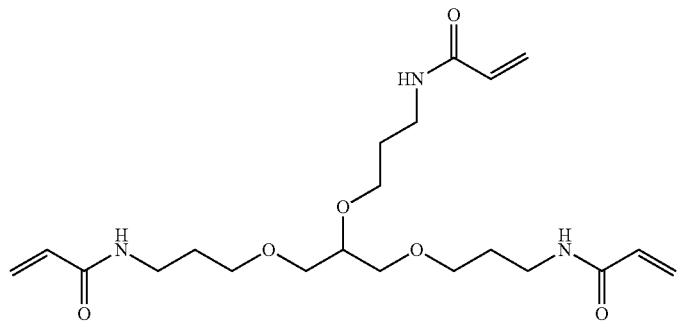

Polymerizable Compound 8

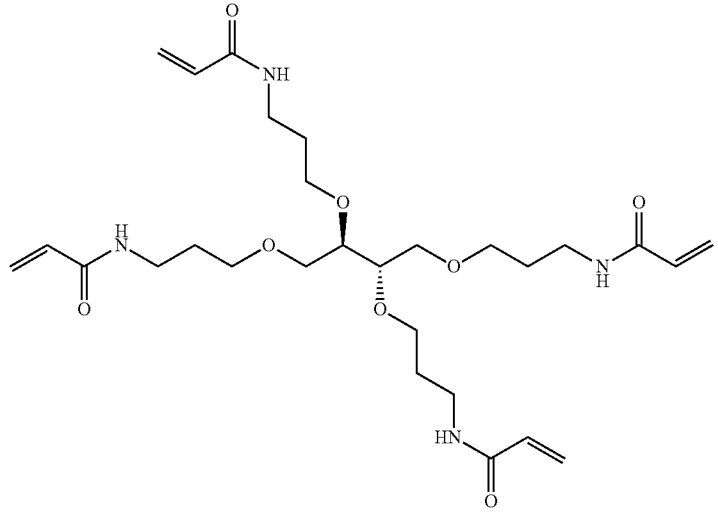

Polymerizable Compound 9
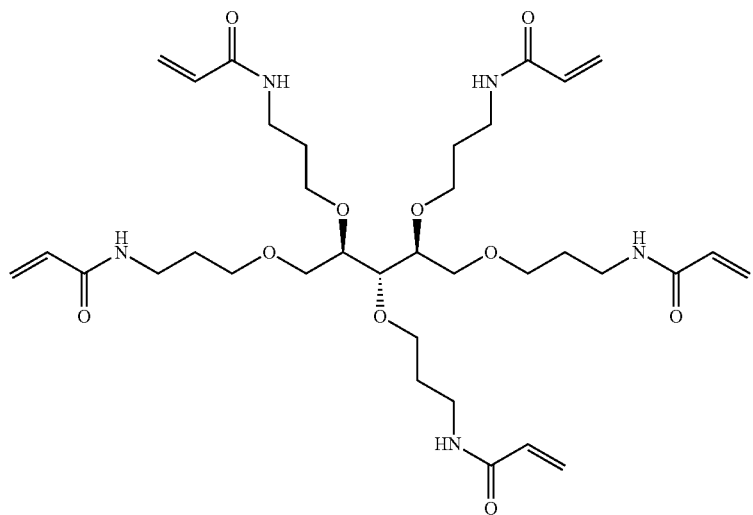
Polymerizable Compound 10
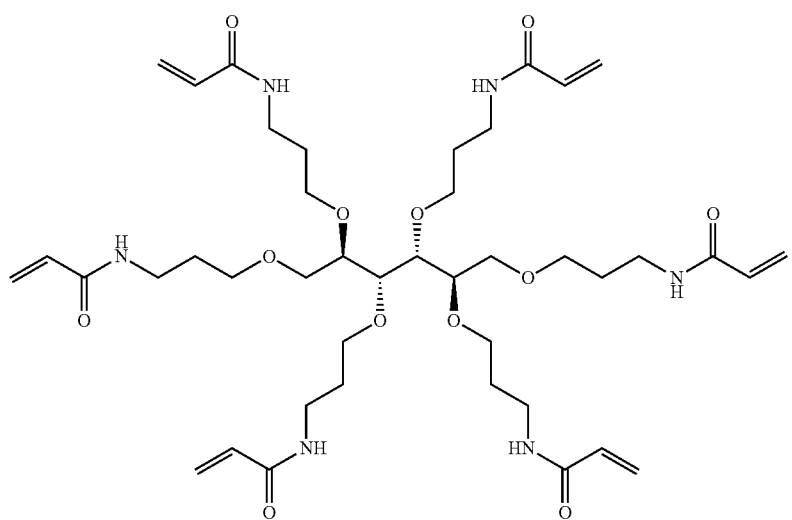
Polymerizable Compound 11
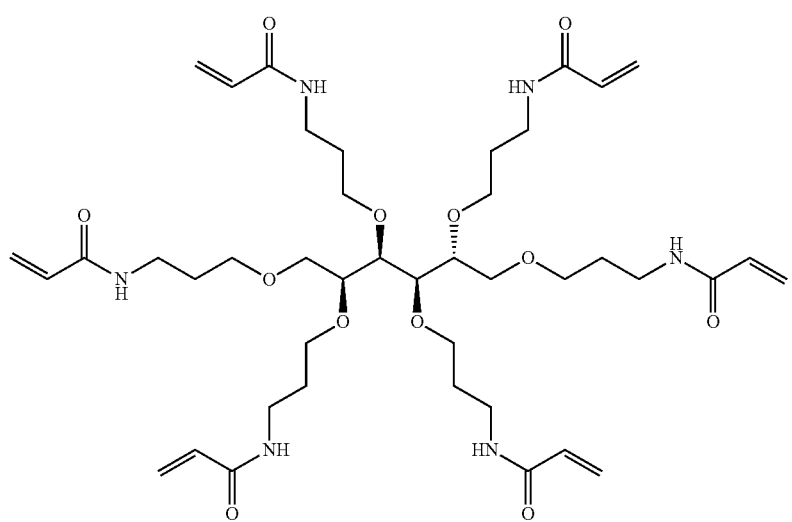

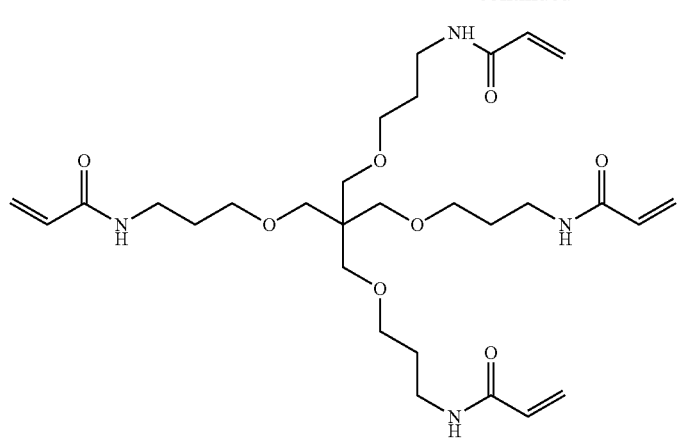

Polymerizable Compound 12

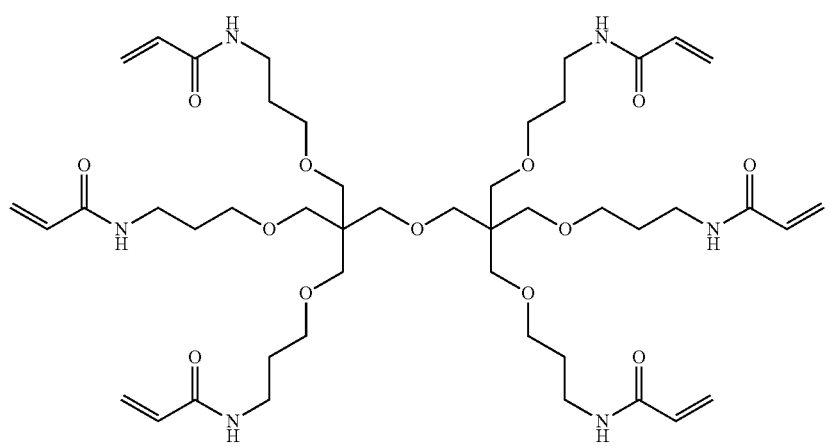

Polymerizable Compound 13

The polymerizable compound represented by Formula (3) can be prepared according to, for example, the following scheme. In the functional polymer membrane of the present invention, the compound represented by Formula (3) may be used in combination of two or more kinds thereof. Moreover, the compound represented by Formula (3) may be used in combination with the compound represented by Formula (2).

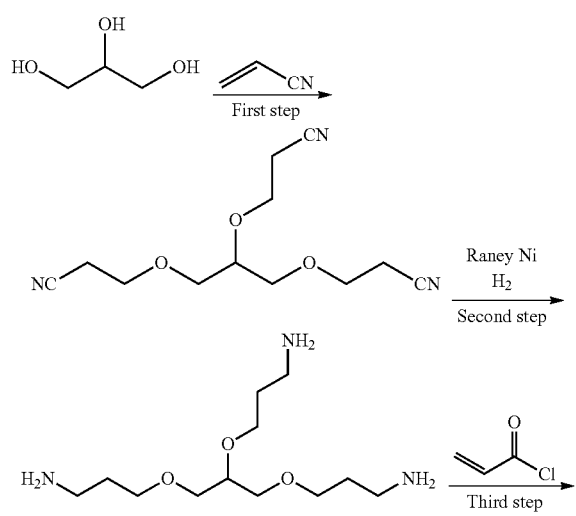

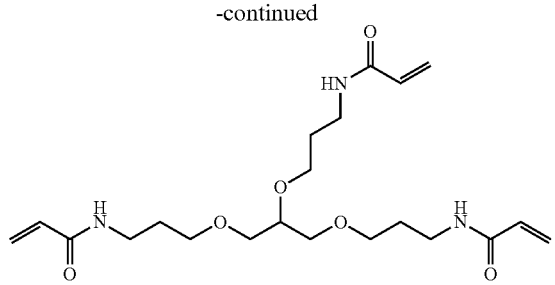

Polymerizable Compound 7

Scheme (First step) The first step is a step of obtaining a polycyano compound by a reaction of acrylonitrile and glycerine. The reaction in this step is preferably carried out at the temperature of 0 to 60° C. for 2 to 6 hours.

(Second step) The second step is a step of reacting the polycyano compound with hydrogen in the presence of a catalyst and obtaining a polyamine compound by a reduction reaction. The reaction in this step is preferably carried out at the temperature of 5 to 75° C. for 2 to 8 hours.

(Third step) The third step is a step of obtaining a polyfunctional acrylamide compound by an acylating reaction of the polyamine compound, and acrylic acid chloride or methacrylic acid chloride. The reaction in this step is preferably carried out at the temperature of 3 to 25° C. for 1 to 5 hours. Herein, instead of acrylic acid chloride, the acylating agent may use diacrylate anhydride or dimethacrylic anyhydride. Herein, in the acylation step, by using both acrylic acid chloride and methacrylic acid chloride, it is possible to obtain a compound having an acrylamide group and methacrylamide group in the same molecule as the final product.

The compound obtained through the above-described steps can be obtained by purification of the reaction product solution by a usual method. For example, it is possible to perform purification by liquid separation and extraction using an organic solvent, crystallization using a poor solvent, column chromatography using silica gel, or the like.

Monofunctional Polymerizable Compound (B)

The functional polymer membrane of the present invention can be obtained by polymerizing (curing) the polymerizable compound (A) represented by Formula (1) and the monofunctional polymerizable compound (B).

Such a monofunctional polymerizable compound includes a (meth)acrylate compound, a (meth)acrylamide compound, a vinyl ether compound, an aromatic vinyl compound, an N-vinyl compound (a polymerizable monomer having an amide bond), and an allyl compound.

In view of stability and pH tolerance of the resultant functional polymer membrane, these compounds preferably include one having no ester bond, a (meth)acrylamide compound, a vinyl ether compound, an aromatic vinyl compound, an N-vinyl compound (a polymerizable monomer having an amide bond), or an allyl compound, and particularly preferably, a (meth)acrylamide compound.

Examples of the monofunctional polymerizable compound include compounds described in JP-A-2008-208190 ("JP-A" means unexamined published Japanese patent application) and JP-A-2008-266561.

These monofunctional polymerizable compounds preferably have a dissociative group, as described later, for giving a function of the polymer membrane.

For example, the (meth)acrylate compound has preferably a substituent (specific examples of a preferred substituent include a substituent described later) in an alcohol moiety of ester, and particularly preferably, a dissociative group in an alkyl moiety of alcohol.

As the monofunctional polymerizable compound having a (meth)acrylamide structure used in the present invention, a compound represented by Formula (4) is preferable.

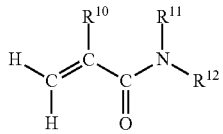

Formula (4)

In Formula (4), $R^{10}$ represents a hydrogen atom or a methyl group. $R^{11}$ represents a hydrogen atom, or a substituted or unsubstituted alkyl group. $R^{12}$ represents a substituted or unsubstituted alkyl group. Herein, the alkyl groups of $R^{11}$ and $R^{12}$ may be bonded to each other to form a ring.

$R^{10}$ is preferably a hydrogen atom.

The alkyl group of $R^{11}$ and $R^{12}$ is preferably an alkyl group having 1 to 18 carbon atoms, more preferably an alkyl group having 1 to 12 carbon atoms, and further preferably an alkyl group having 1 to 6 carbon atoms. Examples of the alkyl group of $R^{11}$ and $R^{12}$ include methyl, ethyl, n-propyl, iso-propyl, n-butyl, t-butyl, n-pentyl, n-hexyl, n-octyl, t-octyl, n-decyl, and n-octadecyl.

These alkyl groups each are preferably a linear or branched alkyl group, and may have a substituent.

Examples of the substituent of the alkyl group include a hydroxyl group, a sulfo group or a salt thereof, a carboxy group or a salt thereof, an onio group (e.g. an ammonio group, a pyridinio group, and a sulfonio group), a halogen atom, an alkyl group, an aryl group, a heterocyclic group, an alkoxy group, an aryloxy group, an alkylthio group, an arylthio group, an amino group (including an amino group, an alkylamino group, an arylamino group and a heterocyclic amino group), an amide group, a sulfonamide group, a carbamoyl group, a sulfamoyl group, an acyl group, and a cyano group.

In the present invention, in particular, in order to give the function of the polymer membrane, the function is preferably given by a substituent of this alkyl group. Therefore, among the above-described substituents a dissociative group or a polar substituent is preferable, and a dissociative group is particularly preferable.

In the cation exchange membrane, the dissociative group is preferably a hydroxyl group (in particular, a phenolic or enolic hydroxyl group), a sulfo group or a salt thereof, or a carboxy group or a salt thereof; and more preferably a sulfo group or a salt thereof, or a carboxy group or a salt thereof Herein, the salt of the sulfo group or the carboxy group preferably includes a cation of an alkali metal atom, such as a lithium ion, a potassium ion or a sodium ion.

In the anion exchange membrane, the dissociative group is preferably an onio group, and more preferably a group represented by the following Formula (a) or (b).

$$—N(Rb)_3^+ X^-$$ Formula (a)

$$—S(Rb)_2^+ X^-$$ Formula (b)

In Formulas (a) and (b), Rb represents an alkyl group or an aryl group. Plural Rb's may be the same as or different from each other, and two Rb's may be bonded to each other to form a ring.

$X^-$ represents a negative ion.

The alkyl group of Rb has preferably 1 to 18 carbon atoms, more preferably 1 to 12 carbon atoms, and further preferably 1 to 6 carbon atoms. The alkyl group may have a substituent. Specific examples of such a substituent include a substituent that the alkyl group in $R^{11}$ and $R^{12}$ may have. Above all, the substituent preferably includes an aryl group. The alkyl group in which the aryl group in Rb is substituted preferably includes a benzyl group.

The aryl group of Rb has preferably 6 to 18 carbon atoms, and more preferably 6 to 12.

The aryl group of Rb may have a substituent. Specific examples of such a substituent include a substituent that the alkyl group in $R^{11}$ and $R^{12}$ may have.

A ring formed by bonding of two of Rb with each other preferably includes a 5-membered ring or a 6-membered ring.

Such a ring preferably includes, in Formula (a), a nitrogen-containing aromatic ring, and above all, preferably, a pyridine ring.

Specific examples of $X^-$ include a halogen ion, a carboxylic acid ion (for example, an acetic acid ion and a benzoic acid ion), a sulfuric acid ion, an organic sulfuric acid ion (a methanesulfonic acid ion, a benzenesulfonic acid ion and a p-toluenesulfonic acid ion) and OH.

Examples of the group represented by Formula (a) include trimethylammonio, triethylammonio, tributylammonio, dimethylbenzylammonio, dimethylphenylammonio, dimethylcetylammonio, and pyridinio.

Examples of the group represented by Formula (b) include dimethylsulfonio, methylbenzylsulfonio, and methylphenylsulfonio.

Among the group represented by Formula (a) or Formula (b), the group represented by Formula (a) is preferable.

The substituent that the alkyl group in $R^{11}$ and $R^{12}$ may have includes preferably a polar group, other than the above-descried dissociative group, preferably, an acyl group or an amino group, and particularly preferably, an amino group. The amino group preferably includes a tertiary amino group, and preferably, a group represented by Formula (c).

$$—N(Rb)_2$$ Formula (c)

In Formula (c), Rb has the same meaning as Rb in Formula (a), and a preferable range thereof is also the same.

Examples of the group represented by Formula (c) include dimethylamino, and diethyl amino.

Among the substituents that the alkyl group in $R^{11}$ and $R^{12}$ may have, the acyl group may include any of an alkylcarbonyl group and an arylcarbonyl group, but preferably includes an alkylcarbonyl group. The number of carbon atoms of the alkylcarbonyl group is preferably 2 to 12. The number of carbon atoms of the arylcarbonyl group is preferably 7 to 12. Examples of the acyl group include acetyl, propionyl, pivaloyl, and benzoyl.

When the alkyl group in $R^{11}$ and $R^{12}$ has a substituent, the number of carbon atoms in an alkyl group moiety is preferably 1 to 6, and more preferably, 1 to 3.

A ring formed by bonding of $R^{11}$ and $R^{12}$ with each other may include any of a hydrocarbon ring or a hetero ring. In the case of the hetero ring, a ring constituting atom preferably includes an oxygen atom, a nitrogen atom or a sulfur atom.

The ring formed by bonding of $R^{11}$ and $R^{12}$ with each other preferably includes a 5-membered ring or a 6-membered ring.

Examples of these rings include a cyclopentane ring, a cyclohexane ring, a piperidine ring, a morpholine ring, a piperazine ring, a furan ring, a pyrrole ring, and a thiophene ring.

In Formula (4), one of $R^{11}$ and $R^{12}$ is preferably a hydrogen atom or a methyl group, particularly preferably a hydrogen atom.

Specific examples of the monofunctional compound having a (meth)acrylamide structure represented by Formula (4) include the following exemplified compounds (B-1) to (B-23). However, the present invention is not limited thereto.

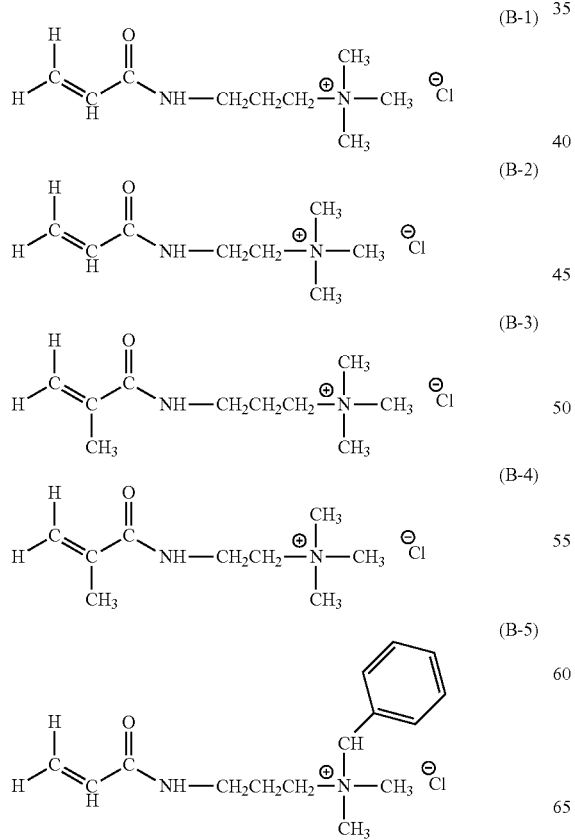

-continued

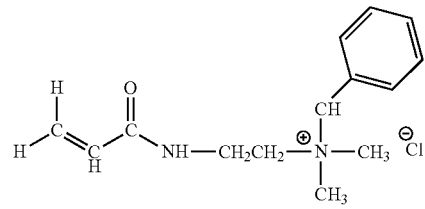

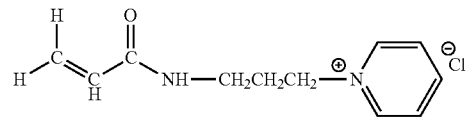

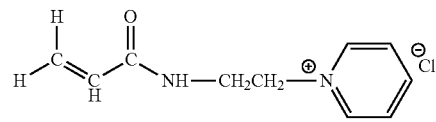

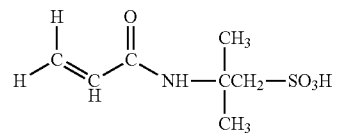

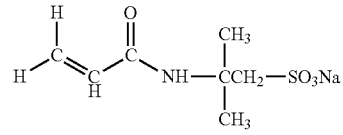

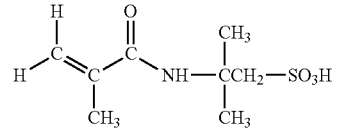

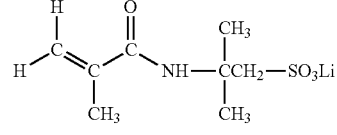

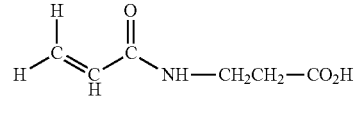

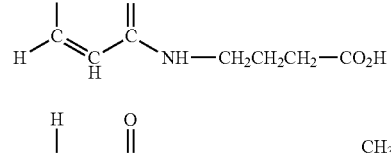

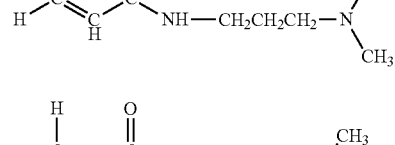

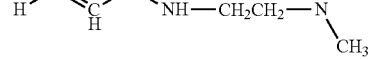

-continued (B-17)
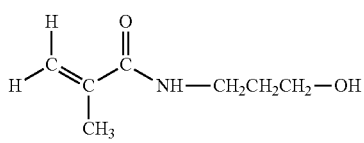

(B-18)
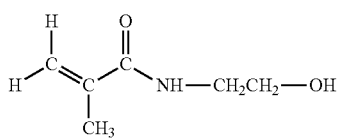

(B-19)
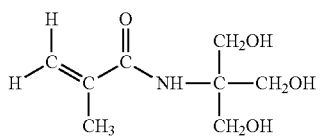

(B-20)
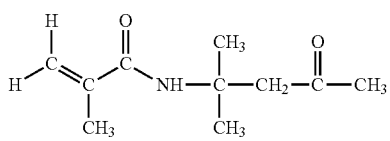

(B-21)
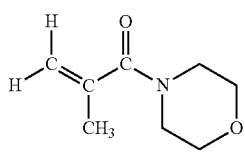

(B-22)
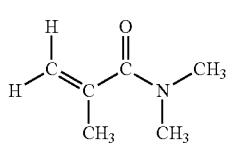

(B-23)
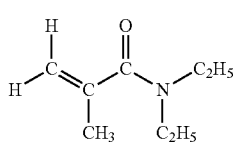

These compounds are available from Kohjin Co., Ltd, Kyowa Hakko Chemical Co., Ltd., Fluka Corporation, Sigma-Aldrich Corporation or Toagosei Co., Ltd., or can be easily synthesized by a publicly known method.

As a ratio of a content of the polymerizable compound (A) represented by Formula (2) to a content of the above-described monofunctional polymerizable compound (B), the polymerizable compound (A) represented by Formula (2) is preferably 1 to 45 parts by mass, further preferably, 10 to 45 parts by mass, and still further preferably, 10 to 40 parts by mass, based on 100 parts by mass of the above-described monofunctional polymerizable compound (B).

As a ratio of a content of the polymerizable compound (A) represented by Formula (3) to a content of the above-described (B) monofunctional polymerizable compound (B), the polymerizable compound (A) represented by Formula (3) is preferably 10 to 200 parts by mass, further preferably, 20 to 100 parts by mass, and still further preferably, 30 to 60 parts by mass, based on 100 parts by mass of the above-described monofunctional polymerizable compound (B).

Moreover, the polymerizable compound (A) represented by Formula (3) is preferably 1 to 40% by mass, further preferably, 10 to 40% by mass, and still further preferably, 15 to 30% by mass, based on the total mass of the composition according to the present invention.

If the ratio is in the above-described preferred range, the composition is excellent in desired curing properties, the pH tolerance, the mechanical strength and soft properties.

Photopolymerization Initiator (C)

The composition of the present invention preferably contains a polymerization initiator.

The polymerization initiators, in the present invention, preferably include a photopolymerization initiator that can allow polymerization by irradiation with energy rays.

Examples of a photopolymerization initiator include aromatic ketones, acylphosphine compounds, aromatic onium salt compounds, organic peroxides, thio compounds, hexaaryl biimidazole compounds, ketoxime ester compounds, borate compounds, azinium compounds, methallocene compounds, active ester compounds, compounds having a carbon-halogen bond, alkylamine compounds, and the like.

Preferable examples of the aromatic ketones, acylphosphine oxide compounds and thio compounds include compounds having a benzophenone skeleton or a thioxanthone skeleton described in "RADIATION CURING IN POLYMER SCIENCE AND TECHNOLOGY", pp. 77 to 117 (1993), and the like. More preferable examples may include α-thiobenzophenone compounds described in JP-B-47-6416 ("JP-B" means examined Japanese patent publication); benzoin ether compounds described in JP-B-47-3981; α-substituted benzoin compounds described in JP-B-47-22326; benzoin derivatives described in JP-B-47-23664; aroyl phosphonate esters described in JP-A-57-30704; dialkoxybenzophenone described in JP-B-60-26483; benzoin ethers described in JP-B-60-26403 and JP-A-62-81345; α-aminobenzophenones described in JP-B-1-34242, U.S. Pat. No. 4,318,791, and EP 0284561 A1; p-di(dimethylaminobenzoyl)benzene described in JP-A-2-211452; thio-substituted aromatic ketones described in JP-A-61-194062; acylphosphine sulfide described in JP-B-2-9597; acylphosphine described in JP-13-2-9596; thioxanthones described in JP-B-63-61950; coumarins described in JP-B-59-42864, and the like. Further, polymerization initiators described in JP-A-2008-105379 and JP-A-2009-114290 are also preferable. Further, specific examples of the polymerization initiator may include polymerization initiators as described in pp. 65 to 148 of "System of curing by ultraviolet rays" by Kiyoshi Kato (published by SOGO GIJYUTSU CENTER Corporation, 1989).

In the present invention, the polymerization initiator is preferably a water soluble polymerization initiator.

Note that, the term "water soluble" used in the polymerization initiator means that the initiator is dissolved in distilled water at 25° C. in an amount of 0.1 mass % or more. The water soluble polymerization initiator is further preferably dissolved in distilled water at 25° C. in an amount of 0.5 mass % or more, particularly preferably 1 mass % or more, and most preferably 3 mass % or more.

Among those, a photopolymerization initiator which is suitable for the composition of the present invention is aromatic ketones (in particular, α-hydroxy-substituted benzoin compound) or an acylphosphineoxide compound. Particularly, p-phenyl benzophenone (manufactured by Wako Pure Chemical Industries, Ltd.), bis(2,4,6-trimethylbenzoyl) phenylphosphine oxide (Irgacure 819, manufactured by BASF Japan Ltd.), 2,4,6-trimethylbenzoyl diphenylphosphine oxide (Darocur TPO, manufactured by BASF Japan Ltd.), 2-benzyl-2-dimethylamino-1-(4-morpholinophenyl)-butanone-1 (Irgacure 369, manufactured by BASF Japan Ltd.), 2-methyl-1-(4-methylthiophenyl)-2-morpholinopropan-1-one (Irgacure 907, manufactured by BASF Japan Ltd.), 1-[4-(2-hydroxyethoxy)-phenyl]-hydroxy-2-methyl-1-propane-1-one (Irgacure 2959, manufactured by BASF Japan Ltd.), and 2-hydroxy-2-methyl-1-phenyl-propane-1-one (Darocur 1173, manufactured by BASF Japan Ltd.) are preferable; and Irgacure 2959 (manufactured by BASF Japan Ltd.) and Darocur 1173 (manufactured by BASF Japan Ltd.) are most preferable, from the viewpoint of water-soluble and hydrolysis-resistance.

In the present invention, a content of the polymerization initiator is preferably 0.1 to 10 parts by mass, further preferably, 0.1 to 5 parts by mass, and still further preferably, 0.3 to 2 parts by mass, based on 100 parts by mass of the total solid mass in the composition.

Polymerization Inhibitor (D)

The composition according to the present invention preferably contains a polymerization inhibitor.

As the polymerization inhibitor, known polymerization inhibitors can be used. Examples thereof include a phenol compound, a hydroquinone compound, an amine compound, and a mercapto compound.

Specific examples of the phenol compound include hindered phenol (phenol having a t-butyl group in an ortho position, and typified by 2,6-di-t-butyl-4-methylphenol) and bisphenol. Examples of the hydroquinone compound include monomethylether hydroquinone. Examples of the amine compound include N-nitroso-N-phenyl hydroxylamine, and N,N-diethylhydroxylamine.

These polymerization inhibitors may be used alone in one kind or in combination with two or more kinds.

A content of the polymerization inhibitor is preferably 0.01 to 5 parts by mass, further preferably, 0.01 to 1 part by mass, and still further preferably, 0.01 to 0.5 part by mass, based on 100 parts by mass of the total solid content in the composition.

Solvent (E)

The composition of the present invention may contain the solvent (E). A content of the solvent (E) in the composition is preferably 5 to 50% by mass, further preferably, 10 to 50% by mass, and still further preferably, 10 to 40% by mass, based on the total mass of the composition.

When the composition contains the solvent, the curing (polymerization) reaction uniformly and smoothly progresses. Moreover, when the composition is impregnated into the porous support, impregnation smoothly progresses.

The solvent (E) having a solubility to water in an amount of 5% by mass or more is preferably used, and one that is freely mixed with water is further preferred. Therefore, a solvent selected from water and a water-soluble solution is preferred.

The water-soluble solution particularly preferably includes an alcohol-based solvent, an ether-based solvent being an aprotic polar solvent, an amide-based solvent, a ketone-based solvent, a sulfoxide-based solvent, a sulfone-based solvent, a nitrile-based solvent and an organic phosphorus-based solvent.

Examples of the alcohol-based solvents include methanol, ethanol, isopropanol, n-butanol, ethylene glycol, propylene glycol, diethylene glycol, and dipropylene glycol. These solvents can be used alone in one kind or in combination of two or more kinds.

Preferred specific examples of the aprotic polar solvents include dimethyl sulfoxide, dimethylimidazolidinone, sulfolane, N-methylpyrrolidone, dimethylformamide, acetonitrile, acetone, dioxane, tetramethyl urea, hexamethyl phosphoramide, pyridine, propionitrile, butanone, cyclohexanone, tetrahydrofuran, tetrahydropyran, ethyleneglycol diacetate and γ-butyrolactone. Among these, dimethylsulfoxide, N-methylpyrrolidone, dimethylformamide, dimethylimidazolidinone, sulfolane, acetone, acetonitrile and tetrahydrofuran are preferred. These solvents may be used alone or in combination of two or more kinds.

Alkali Metal Compound (F)

The composition of the present invention may contain an alkali metal compound (F) in order to improve solubility of the above-described compound having (meth)acrylamide structure. The alkali metal compound preferably includes a hydroxide salt of lithium, sodium or potassium, a chloride salt thereof and a nitrate salt thereof. Above all, a lithium compound is further preferred and specific examples thereof include lithium hydroxide, lithium chloride, lithium bromide, lithium nitrate, lithium iodide, lithium chlorate salt, lithium thiocyanate, lithium perchlorate, lithium tetrafluoroborate, lithium hexatluorophosphate and lithium hexafluoroarsenate.

Herein, the alkali metal compound is also preferably used in order to neutralize the composition or a composition solution mixture.

These alkali metal compounds may be hydrate. Moreover, these compounds can be used alone in one kind or in combination with two or more kinds.

An amount of addition when the alkali metal compound is added is preferably 0.1 to 20 parts by mass, further preferably, 1 to 20 parts by mass, and still further preferably, 5 to 20 parts by mass, based on 100 parts by mass of the total solid content in the composition.

In addition to the above-described alkali metal compound, the composition may contain, when necessary, a surfactant, a viscosity improver, a surface tension adjuster or a preservative, for example.

Next, the method of producing a functional polymer membrane according to the present invention will be described.

Upon producing the functional polymer membrane in the present invention, the support or a temporary support (a support simply for applying the composition of the present invention to form the membrane, and the support being peeled therefrom after the membrane is formed. The support and the temporary support are hereinafter collectively referred to as the support) is preferably used.

When the composition of the present invention is coated by application, impregnation or the like into the support, the membrane can be prepared in a batch process using an immobilized support, but can be also prepared in a continuous process using a moving support. The support may have a roll shape to be continuously rewound. When the membrane is prepared in the continuous process, the support is placed on a continuously moving belt to allow preparation of the membrane (or a combination of these methods). If such a method is applied, the above-described composition of the present invention can be coated onto the support in the continuous process, or can be coated in a large-scale batch process.

When the support used for reinforcing the mechanical strength, particularly, the porous support is used, the temporary support may be used. In this case, if the composition of the present invention is soaked into the porous support, and the curing reaction is terminated, only the temporary support is peeled from the membrane.

In such a temporary support, no consideration of substance permeation is required, and as long as the temporary support can be immobilized for forming the membrane, any material may as well used, for example, including a PET film and a metal plate such as an aluminum plate.

Moreover, the composition of the present invention can be soaked into the porous support to allow curing without using a support other than the porous support.

The composition of the present invention can be applied to the porous support layer by, for example, curtain coating, extrusion coating, air-knife coating, slide coating, nip roll coating, forward roll coating, reverse roll coating, dip coating, kiss coating, rod bar coating or spray coating. The coating of multiple layers can be done simultaneously or consecutively. For simultaneous coating of multiple layers, curtain coating, slide coating, slot die coating and extrusion coating are preferred.

Accordingly, in a preferred method, the composition of the present invention is continuously produced on the moving support, further preferably, according to a production unit including a composition application unit, an irradiation source for curing the composition, a membrane collection unit and a means for moving the support from the above-described composition application unit to the irradiation source and the membrane collection unit.

In a preferred production process of the present invention, the functional polymer membrane of the present invention is produced through a process of (i) applying and/or impregnating the composition according to the present invention into the porous support, (ii) allowing the reaction of curing the composition by irradiation with light, and (iii) removing the membrane formed in compliance with desire from the support.

The above-described composition application unit in the present invention can be placed in a position upstream of the irradiation source, and the irradiation source is placed in a position upstream of the membrane collection unit.

In order to apply the composition using a high-speed coating machine, the composition being the application liquid preferably has sufficient flowability. The composition of the present invention preferably has a viscosity of less than 4,000 m·Pas, more preferably from 1 to 1,000 mPa·s, and most preferably from 1 to 500 mPa·s, when measured at 35° C. For coating methods such as slide bead coating, the preferred viscosity is from 1 to 100 mPa·s when measured at 35° C.

If a high-speed coating technique is applied, the composition of the present invention can be applied onto the moving support at a rate exceeding 15 m/min, or exceeding 20 m/min, for example, and further at a high rate such as 60 m/min or 120 m/min or reaching 400 m/min at maximum.

When the functional polymer membrane is incorporated into the porous support in order to improve the mechanical strength, particularly as the support, one is preferably used in which the support is subjected to corona discharge treatment, glow discharge treatment, flame treatment or ultraviolet light irradiation treatment, as mentioned above, to improve wettability and adhesion strength.

During the curing reaction, the polymerizable compound (A) represented by Formula (1) and the monofunctional polymerizable compound (B) are polymerized to form a polymer. The curing reaction can be carried out by irradiation with light under conditions in which curing is caused at quickness enough to form the membrane within 30 seconds.

The curing reaction is preferably initiated within 60 seconds, further preferably, within 15 seconds, particularly preferably, within 5 seconds, and most preferably, within 3 seconds after the composition of the present invention is applied or impregnated into the support.

Curing reaction time, in particular, exposure time (irradiation time) for the curing reaction is preferably less than 30 seconds, further preferably, less than 10 seconds, and furthermore preferably, less than 5 seconds, particularly preferably, less than 3 seconds, and most preferably, less than 2 seconds. In the above-described continuous coating method, the curing reaction time is determined by a rate at which the composition moving on the support passes through an irradiation beam and moves, while the irradiation with light is continuously performed.

When high-intensity energy rays, particularly, ultraviolet light (UV light) is used for the curing reaction, a considerable amount of heat may be generated. Therefore, in order to prevent overheat, cooling air is preferably used for a lamp and/or the support/membrane. Moreover, a significant dose of infrared light (IR light) is irradiated together with the ultraviolet light (UV light) in several cases, and therefore the ultraviolet light (UV light) is preferably irradiated through a filter of an IR reflective quartz plate.

As the energy rays for irradiation in the curing reaction, ultraviolet light is preferred. As a wavelength for irradiation in this case, a wavelength matching with an absorption wavelength of an arbitrary photoinitiator included in the composition is preferable, and for example, UV-A (400 to 320 nm), UV-B (320 to 280 nm) or UV-C (280 to 200 nm) is preferred.

An ultraviolet light source as the irradiation light source is a mercury arc lamp, a carbon arc lamp, a low pressure mercury lamp, a medium pressure mercury lamp, a high pressure mercury lamp, a swirl-flow plasma arc lamp, a metal halide lamp, a xenon lamp, a tungsten lamp, a halogen lamp, laser and an ultraviolet light-emitting diode. Particularly preferred are ultraviolet light emitting lamps of the medium or high pressure mercury vapor type. In addition thereto, one is also preferred in which an additive such as metal halide is added to in order to modify an emission spectrum of the lamp. In most cases, lamps with emission maxima between 200 and 450 nm are particularly suitable.

The energy output of the irradiation source is preferably from 20 to 1,000 W/cm, preferably from 40 to 500 W/cm, but may be higher or lower as long as the desired exposure dose can be realized. The degree of cure is controlled by exposure intensity. The exposure dose is preferably 40 mJ/cm$^2$, more preferably between 40 and 1,000 mJ/cm$^2$, furthermore preferably between 40 and 600 mJ/cm$^2$ particularly preferably between 50 and 500 mJ/cm$^2$, most preferably between 70 and 220 mJ/cm$^2$ as measured by High Energy UV Radiometer (UV Power Puck™ manufactured by EIT-Instrument Markets) in the UV-A range indicated by the apparatus. The exposure time can be freely selected, but the above-mentioned exposure time is preferred, and time less than 2 seconds is particularly preferred.

In high-speed coating, a plurality of irradiation sources are preferably used in order to attain a desired dose, and in this case, exposure intensity of the plurality of irradiation sources may be identical with or different from each other.

The functional polymer membrane of the present invention may as well include a membrane alone, but preferably has a support as a reinforcing material in order to improve mechanical strength. The support preferably includes a porous support. This porous support can be formed as part of the membrane by impregnating the composition of the present invention, and then allowing the curing reaction.

Specific examples of the porous support as the reinforcing material include a synthetic woven fabric or synthetic nonwoven fabric, a sponge-like film, and a film having microscopic through-holes. Examples of the material for forming the porous support used in the present invention include polyethylene, polypropylene, polyacrylonitrile, polyvinyl chloride, polyester, polyamide, and copolymers thereof; or porous membranes based on e.g. polysulfone, polyethersulfone, polyphenylenesulfone, polyphenylenesulfide, polyimide, polyethermide, polyamide, polyamideimide, polyacrylonitrile, polycarbonate, polyacrylate, cellulose acetate, polypropylene, poly(4-methyl-1-pentene), polyinylidene fluoride, polytetrafluoroethylene, polyhexafluoropropylene, polychlorotrifluoroethylene, and copolymers thereof. Commercially available porous supports and reinforcing materials are marketed from Japan Vilene Company, Ltd., Freudenberg Filtration Technologies SE & Co. KG (Novatexx material), and Sefar AG, for example. When the composition of the present invention is incorporated into the support being the porous reinforcing material by application or impregnation before curing, the support being the porous reinforcing material to be used preferably includes a support of a raw material that absorbs no irradiation wavelength of the energy rays used for curing. Moreover, the composition of the present invention can preferably penetrate into pores of the support of the porous reinforcing material.

The porous support preferably has hydrophilicity. Therefore, the support to be used is preferably subjected to treatment such as corona discharge treatment, ozone treatment, sulfuric acid treatment and silane coupling agent treatment.

The functional polymer membrane of the present invention contains, in addition to the polyfunctional polymerizable compound (A) represented by Formula (1), the monofunctional polymerizable compound (B), and particularly preferably, the polymerizable compound having the dissociative group. When the monofunctional polymerizable compound is simultaneously used, the functional polymer membrane of the present invention is excellent not only in the ionic transport number and the pH tolerance, but also in suppression of the water permeability. Although this mechanism is not fully made clear, a crosslinking part becomes a three-dimensional manner, and therefore a polymer network becomes tightly, and as a result, the water permeability of a cured film is estimated to be suppressed.

The functional polymer membrane of the present invention is mainly intended to be used in ion exchange. However, the functional polymer membrane of the present invention is not limited to ion exchange, and presumably can be favorably used also for inverse osmosis and gas separation.

EXAMPLES

Hereinafter, the present invention will be described in more detail with reference to examples, but the present invention is not limited to these examples. Unless otherwise noted, "part(s)" and "percent (%)" are on a mass basis.
(Synthesis of Polyfunctional Polymerizable Compound)
—Synthesis of Polymerizable Compound 1—
The exemplified polymerizable compound 1 described above was synthesized according to the following scheme.

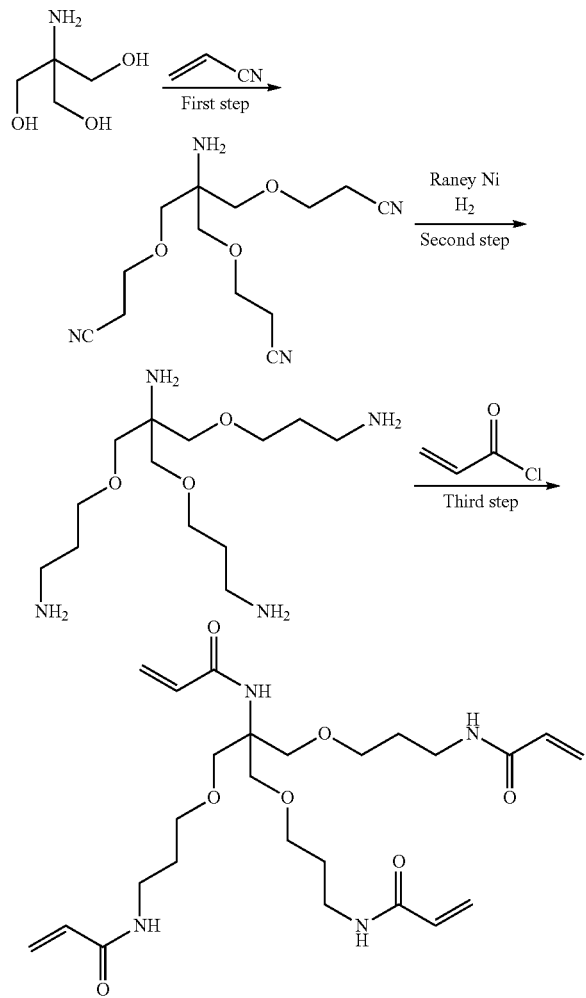

Polymerizable Compound 1

(First Step)
121 g (1 equivalent) of tris(hydroxymethyl)aminomethane (manufactured by Tokyo Chemical Industry Co., Ltd.), 84 mL of 50% potassium hydroxide aqueous solution, and 423 mL of toluene were added to a 1-L capacity three-necked flask equipped with a stir bar and agitated, the reaction system was maintained at 20° C. to 25° C. in a water bath, and 397.5 g (7.5 equivalent) of acrylonitrile was dropped over 2 hours. After agitating for 1.5 hours after the dropping, 540 mL of toluene was added to the reaction system, the reaction mixture was moved to a separating funnel, and the water layer was removed. The remaining organic layer was dried with magnesium sulfate, thereafter celite filtration was performed, and the solvent was distilled off under reduced pressure, whereby an acrylonitrile adduct was obtained. The result of analysis by $^1$H NMR and MS of the obtained substance showed a good match with the $^1$H NMR spectrum of the known substances, so the substance was used in the next reduction reaction without further purification.

(Second Step)
24 g of the acrylonitrile adduct that was obtained above, 48 g of a Ni catalyst (Raney nickel 2,400, manufactured by W. R. Grace & Co.), and 600 mL of a 1:1 solution of 25% ammonia water and methanol were put into a 1-L capacity autoclave and suspended, and the reaction container was closed. Hydrogen at 10 MPa was introduced to the reaction container and allowed to react for 16 hours at a reaction temperature of 25° C.

The disappearance of the raw materials was confirmed by $^1$H NMR, the reaction mixture was celite filtered, and the celite was washed several times with methanol. The solvent was distilled off at reduced pressure from the filtrate, whereby a polyamine compound was obtained. The obtained substance was used in the next reaction without further purification.

(Third Step)
30 g of the polyamine compound that was obtained above, 120 g (14 equivalent) of $NaHCO_3$, 1 L of dichloromethane, and 50 mL of water were added to a 2-L capacity three-necked flask equipped with an agitator, 92.8 g (10 equivalent) of acryloyl chloride was dropped over 3 hours in an ice bath, and thereafter the mixture was agitated for 3 hours at room temperature. The disappearance of the raw materials was confirmed by $^1$H NMR, thereafter the solvent was distilled off at reduced pressure from the reaction mixture, the reaction mixture was dried with magnesium sulfate, celite filtration was performed, and the solvent was distilled off under reduced pressure. Finally, the mixture was purified by column chromatography (ethyl acetate/methanol=4:1), whereby a white solid (yield 40%) was obtained at normal temperature. The yield of the three steps was 40%.

$^1$H-NMR of the resultant white solid was measured under the measuring conditions described below. FIG. 1 shows a $^1$H-NMR spectrum.

$^1$H-NMR solvent: Deuterated chloroform, Internal standard: TMS

From the data of $^1$H-NMR shown in FIG. 1, since the integrated ratio of the peak of one hydrogen which was derived from acrylic near 5.6 ppm was 4 with respect to 6 of the integrated ratio of singlet peak (peak derived from the mother skeleton) near 3.75 ppm, it was found that the compound had four acrylic amide groups. From these results, it was confirmed that this white solid had a structure shown by the polymerizable compound 1.

—Synthesis of Polymerizable Compound 7—
(First Step)
Glycerin (10.0 g), toluene (100 mL) and a 50% potassium hydroxide aqueous solution (7.3 g) were added into a 500-mL three-neck flask, and the contents of the flask were stirred while the flask was placed in a water bath. Subsequently, acrylonitrile (43.2 g) was dropwise added thereto over two hours while maintaining the temperature in the flask at from 20 to 25° C. After the completion of the dropwise addition, the contents of the flask were stirred for 1.5 hours. Thereafter, the resultant reaction mixture was allowed to separate, and the resultant aqueous layer was removed. Magnesium sulfate was added to the organic layer obtained, thereby adequately drying the organic layer. The organic layer was then subjected to celite filtration. The filtrate was concentrated under reduced pressure, as a result of which 25.9 g of a polycyano compound was obtained (yield: 95%). The obtained polycyano compound was used, without purification, in the following reduction reaction.

(Second Step)

The polycyano compound (25.0 g) obtained above, Ni catalyst (Raney NI 2400, trade name, manufactured by W.R. Grace & Co.) (25.0 g), methanol (300 mL) and a 25% ammonia water (300 mL) were added into a 1 L autoclave, and stirred. After purging the inside of the autoclave with nitrogen, hydrogen was introduced into the autoclave to have a hydrogen partial pressure of 5 MPa, and the contents of the autoclave were allowed to react at 25° C. for 16 hours. The resultant reaction solution was subjected to celite filtration to remove the Ni catalyst. A polyamine compound (24.5 g, yield: 98%) was obtained by concentrating the filtrate under reduced pressure. The obtained polyamine compound was used, without purification, in the following reaction.

(Third Step)

The polyamine compound (24.0 g) obtained above, triethylamine (41.5 g) and chloroform (300 mL) were added to a 1 L three-neck flask, and were stirred while cooled in an ice bath. Subsequently, acryloyl chloride (29.7 g) was dropwise added thereto while the temperature inside the flask was maintained at 10° C. or lower. After the completion of the dropwise addition, the contents of the flask were stirred at room temperature for two hours. The resultant reaction mixture was separated by adding a saturated ammonium chloride aqueous solution (300 mL), and the resultant aqueous layer was extracted three times using 300 mL of chloroform. Magnesium sulfate was added to the organic layer obtained, thereby adequately drying the organic layer. The organic layer was then subjected to celite filtration. After the filtrate was concentrated under reduced pressure, purification using silica gel column chromatography (ethyl acetate:methanol=85:15) was carried out, as a result of which 20.5 g of polymerizable compound 1 (colorless liquid, yield: 53%), which is the target compound, was obtained. The yield through the three steps was 49%. The synthesis scheme is shown below.

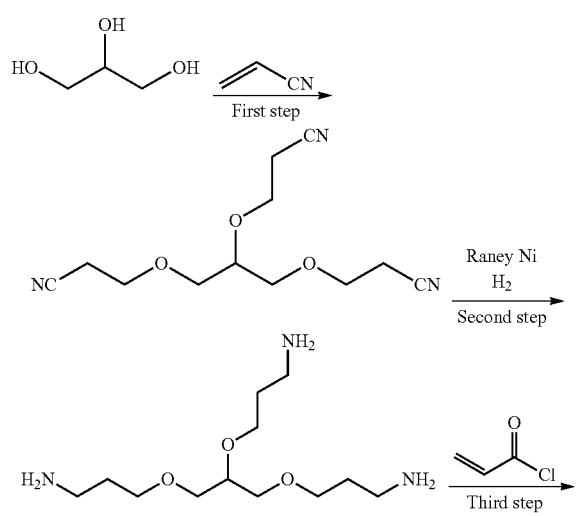

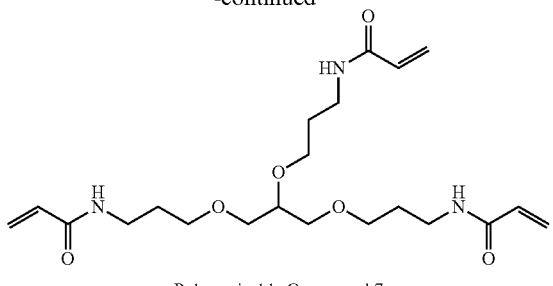

Polymerizable Compound 7

—Synthesis of Polymerizable Compound 8—

The above-described polymerizable compound 8 (white solid) was synthesized in the same manner as in the synthesis of polymerizable compound 1, except that erythritol (9.9 g) was added instead of glycerin in the first step. The yield through the three steps was 53%.

—Synthesis of Polymerizable Compound 9—

The above-described polymerizable compound 9 (colorless liquid) was synthesized in the same manner as in the synthesis of polymerizable compound 1, except that xylitol (9.9 g) was added instead of glycerin in the first step. The yield through the three steps was 24%.

—Synthesis of Polymerizable Compound 10—

The above-described polymerizable compound 10 (colorless liquid) was synthesized in the same manner as in the synthesis of polymerizable compound 1, except that D-mannitol (9.9 g) was added instead of glycerin in the first step. The yield through the three steps was 15%.

—Synthesis of Polymerizable Compound 12—

The above-described polymerizable compound 12 (white solid) was synthesized in the same manner as in the synthesis of polymerizable compound 1, except that pentaerythritol (11.1 g) was added instead of glycerin in the first step. The yield through the three steps was 45%.

—Synthesis of Polymerizable Compound 13—

The above-described polymerizable compound 13 (colorless liquid) was synthesized in the same manner as in the synthesis of polymerizable compound 1, except that dipentaerythritol (13.8 g) was added instead of glycerin in the first step. The yield through the three steps was 19%.

Example 1

(Synthesis of Anion Exchange Membrane)

An application liquid of a composition having a formulation shown in Table 1 below was manually applied to an aluminum plate at a rate of approximately 5 m/min using a 150-μm wire-wound rod, and subsequently the application liquid was impregnated into a non-woven fabric (FO-2223-10, 100 μm in thickness, manufactured by Freudenberg & Co. KG). An excess application liquid was removed using a rod around which no wire was wound. A temperature of the application liquid during application was approximately 50° C. An anion exchange membrane was prepared using a UV exposure system (model: Light Hammer LH6, D-valve, speed: 15 m/min, 100% strength, manufactured by Fusion UV Systems Inc.) and carrying out a reaction of curing of the above-described application liquid-impregnated support. An exposure amount was 750 mJ/cm$^2$ in a UV-A region. The resultant membrane was removed from the aluminum plate, and stored in a 0.1 M NaCl solution at least for 12 hours. The thickness of the obtained membrane was 131 μm.

(Preparation of Cation Exchange Membrane)

A cation exchange membrane was prepared in the same manner as the above-described anion exchange membrane, except that the formulation of the composition was changed to the formulation described in Table 1 below in preparation of the above-described anion exchange membrane. The thickness of the obtained membrane was 135 μm.

Example 2

An anion exchange membrane and a cation exchange membrane in Example 2 were prepared in the same manner as Example 1, except that formulations were changed to the formulations described in Table 1 below in preparation of the anion exchange membrane and the cation exchange membrane in Example 1, respectively. The thicknesses of the thus obtained anion exchange membrane and cation exchange membrane were 138 μm and 140 μm, respectively.

Example 3

An anion exchange membrane and a cation exchange membrane of Example 3 were prepared in the same manner as in the preparation of the anion exchange membrane and cation exchange membrane of Example 1, except that the formulations were changed to the formulations shown in Table 1 below, respectively. The thicknesses of the thus obtained anion exchange membrane and cation exchange membrane were 140 μm and 143 μm, respectively.

Comparative Example 1

With reference to WO 2011/025867 A1, an application liquid of the composition described in Table 1 below was impregnated into a non-woven fabric (FO-2223-10, 100 μm in thickness, manufactured by Freudenberg & Co. KG), and thermal polymerization was carried out at 80° C. for 1 hour under a nitrogen atmosphere to prepare an anion exchange membrane and a cation exchange membrane of Comparative Example 1. The thicknesses of the thus obtained anion exchange membrane and cation exchange membrane were 118 μm and 120 μm, respectively.

[Explanation of Abbreviations in Tables 1 and 2]
PW: Pure water
IPA: Isopropyl alcohol
NMP: N-methylpyrrolidone
DPG: Dipropylene glycol
1-PA: 1-Propyl alcohol
MEHQ: Monomethyl ether hydroquinone
DMAPAA-Q: Dimethylamino propylacrylamide, methyl chloride quarternary ((3-acrylamidopropyl)trimethylammonium chloride)
TMAEMC: Trimethylammonium ethyl methacrylate chloride (2-methacrylamidoethyl trimethylammonium chloride)
AMPS: 2-Acrylamide-2-methylpropanesulfonic acid
2-SEM: 2-Sulfoethyl methacrylate
HEAA: Hydroxyethyl acrylamide
EGDM: Ethylene glycol dimethacrylate
AIBN: Azobisisobutyronitrile
Genorad 16: trade name, manufactured by Rahn AG
Tego Glide 432: trade name, manufactured by Evonik industries Example 4

(Synthesis of Anion Exchange Membrane)

An application liquid of a composition having a formulation shown in Table 2 below was manually applied to an aluminum plate at a rate of approximately 5 m/min using a 150-μm wire-wound rod, and subsequently the application liquid was impregnated into a non-woven fabric (FO-2223-10, 100 μm in thickness, manufactured by Freudenberg & Co. KG). An excess application liquid was removed using a rod around which no wire was wound. A temperature of the application liquid during application was approximately 50° C. An anion exchange membrane was prepared using a UV exposure system (model: Light Hammer LH6, D-valve, speed: 15 m/min, 100% strength, manufactured by Fusion UV Systems Inc.) and carrying out a reaction of curing of the above-described application liquid-impregnated support. Curing time was 0.8 second. Exposure time was 0.47 second. The resultant membrane was removed from the

TABLE 1

| Role | Abbreviation | Example 1 Mass (g) Anion exchange membrane | Example 1 Mass (g) Cation exchange membrane | Example 2 Mass (g) Anion exchange membrane | Example 2 Mass (g) Cation exchange membrane | Example 3 Mass (g) Anion exchange membrane | Example 3 Mass (g) Cation exchange membrane | Comparative example 1 Mass (g) Anion exchange membrane | Comparative example 1 Mass (g) Cation exchange membrane |
|---|---|---|---|---|---|---|---|---|---|
| Solvent | PW | 20.84 | 22.52 | | 22.52 | | 22.52 | | |
| Solvent | IPA | 8.46 | 5.50 | 8.46 | | 8.46 | | | |
| Solvent | NMP | | | | | | | | 39.8 |
| Solvent | DPG | | | | | | | 16.4 | |
| Solvent | 1-PA | | | | | | | 6.7 | |
| Polymerization inhibitor | MEHQ | 0.10 | | 0.10 | | 0.10 | | | |
| Polymerization inhibitor | Genorad16 | | 0.20 | | 0.20 | | 0.20 | | |
| Neutralizing agent | LiOH·H$_2$O | | 9.86 | | 9.86 | | 9.86 | | |
| Anionic monomer | DMAPAA-Q | 40.42 | | 40.42 | | 40.42 | | | |
| Anionic monomer | TMAEMC | | | | | | | 58.1 | |
| Cationic monomer | AMPS | | 46.57 | | 46.57 | | 46.57 | | |
| Cationic monomer | 2-SEM | | | | | | | | 41.50 |
| Monofunctional polymerizable compound | HEAA | | | | | 5.00 | 5.00 | | |
| Crosslinking agent | Polymerizable Compound 1 | 10.00 | 11.09 | 10.00 | 20.00 | 10.00 | 20.00 | | |
| Crosslinking agent | EGDM | | | | | | | 18.10 | 18.20 |
| Radical polymerization initiator | AIBN | | | | | | | 0.70 | 0.60 |
| Photopolymerization initiator | Darocur 1173 | 0.50 | 0.50 | 0.50 | 0.50 | 0.50 | 0.50 | | | aluminum plate, and stored in a 0.1 M NaCl solution at least for 12 hours. The thicknesses of the thus obtained anion exchange membrane was 134 µm.
(Preparation of Cation Exchange Membrane)

A cation exchange membrane was prepared in the same manner as in the preparation of the above-described anion exchange membrane, except that the formulation of the composition was changed to the formulation described in Table 2 below. The thickness of the obtained membrane was 144 µm.

Example 5

An anion exchange membrane and a cation exchange membrane of Example 2 were prepared in the same manner as in the preparation of the anion exchange membrane and cation exchange membrane of Example 4, except that the formulations were changed to the formulations shown in Table 2 below, respectively. The of thicknesses of the thus obtained anion exchange membrane and cation exchange membrane were 133 µm and 141 µm, respectively.

Example 6

An anion exchange membrane and a cation exchange membrane of Example 6 were prepared in the same manner as in the preparation of the anion exchange membrane and cation exchange membrane of Example 4, except that the formulations were changed to the formulations shown in Table 2 below, respectively. The thicknesses of the thus obtained anion exchange membrane and cation exchange membrane were 135 µm and 148 µm, respectively.

Example 7

An anion exchange membrane and a cation exchange membrane of Example 7 were prepared in the same manner as in the preparation of the anion exchange membrane and cation exchange membrane of Example 4, except that the formulations were changed to the formulations shown in Table 2 below, respectively. The thicknesses of the thus obtained anion exchange membrane and cation exchange membrane were 131 µm and 136 µm, respectively.

Example 8

An anion exchange membrane and a cation exchange membrane of Example 8 were prepared in the same manner as in the preparation of the anion exchange membrane and cation exchange membrane of Example 4, except that the formulations were changed to the formulations shown in Table 2 below, respectively. The thicknesses of the thus obtained anion exchange membrane and cation exchange membrane were 128 µm and 135 µm, respectively.

Example 9

An anion exchange membrane and a cation exchange membrane of Example 9 were prepared in the same manner as in the preparation of the anion exchange membrane and cation exchange membrane of Example 4, except that the formulations were changed to the formulations shown in Table 2 below, respectively. The thicknesses of the thus obtained anion exchange membrane and cation exchange membrane were 127 µm and 133 µm, respectively.

Comparative Example 2

With reference to WO 2011/025867 A1, an anion exchange membrane and a cation exchange membrane in Comparative Example 2 were prepared in the same manner as Example 4, except that formulations were changed to the formulations in Table 2 below in preparation of the anion exchange membrane and the cation exchange membrane in Example 4, respectively. The thickness of the thus obtained anion exchange membrane and cation exchange membrane were 134 µm and 140 µm, respectively.

In addition, in Tables 2 and 4 below, "anion" represents the anion exchange membrane and "cation" represents the cation exchange membrane.

TABLE 2

| | | Mass (g) | | | | | | | |
|---|---|---|---|---|---|---|---|---|---|
| | | Example 4 | | Example 5 | | Example 6 | | Example 7 | |
| Role | Abbreviation | anion | cation | anion | cation | anion | cation | anion | cation |
| Solvent | PW | 11.36 | 12.50 | 11.36 | 12.50 | 11.36 | 12.50 | 11.36 | 12.50 |
| Solvent | IPA | 8.41 | 18.10 | 8.41 | 18.10 | 8.41 | 18.10 | 8.41 | 18.10 |
| Solvent | NMP | | | | | | | | |
| Solvent | DPG | | | | | | | | |
| Solvent | 1-PA | | | | | | | | |
| Polymerization inhibitor | MEHQ | 0.05 | | 0.05 | | 0.05 | | 0.05 | |
| Polymerization inhibitor | Genorad16 | | 0.50 | | 0.50 | | 0.50 | | 0.50 |
| Acrylamide solubility improver | Lithium nitrate | 19.94 | | 19.94 | | 19.94 | | 19.94 | |
| Neutralizing agent | LiOH•H$_2$O | | 8.50 | | 8.50 | | 8.50 | | 8.50 |
| Anionic monomer | DMAPAA-Q | 45.78 | | 45.78 | | 45.78 | | 45.78 | |
| Anionic monomer | TMAEMC | | | | | | | | |
| Cationic monomer | AMPS | | 42.77 | | 42.77 | | 42.77 | | 42.77 |

| | | Mass (g) | | | | | |
|---|---|---|---|---|---|---|---|
| | | Example 8 | | Example 9 | | Comparative example 2 | |
| Role | Abbreviation | anion | cation | anion | cation | anion | cation |
| Solvent | PW | 11.36 | 12.50 | 11.36 | 12.50 | | |
| Solvent | IPA | 8.41 | 18.10 | 8.41 | 18.10 | | |
| Solvent | NMP | | | | | | 39.8 |
| Solvent | DPG | | | | | 16.4 | |
| Solvent | 1-PA | | | | | 6.7 | |
| Polymerization inhibitor | MEHQ | 0.05 | | 0.05 | | | |
| Polymerization inhibitor | Genorad16 | | 0.50 | | 0.50 | | |

TABLE 2-continued

| Role | Abbreviation | | | | |
|---|---|---|---|---|---|
| Acrylamide solubility improver | Lithium nitrate | 19.94 | | 19.94 | |
| Neutralizing agent | LiOH·H₂O | | 8.50 | | 8.50 |
| Anionic monomer | DMAPAA-Q | 45.78 | | 45.78 | |
| Anionic monomer | TMAEMC | | | | 58.1 |
| Cationic monomer | AMPS | | 42.77 | | 42.77 |

| | | Mass (g) | | | | | | | |
|---|---|---|---|---|---|---|---|---|---|
| | | Example 4 | | Example 5 | | Example 6 | | Example 7 | |
| Role | Abbreviation | anion | cation | anion | cation | anion | cation | anion | cation |
| Cationic monomer | 2-SEM | | | | | | | | |
| Crosslinking agent | MBA | | | | | | | | |
| Crosslinking agent | Polymerizable Compound 7 | 21.25 | 28.475 | | | | | | |
| Crosslinking agent | Polymerizable Compound 8 | | | 23.2 | 29 | | | | |
| Crosslinking agent | Polymerizable Compound 9 | | | | | 21.21 | 28.28 | | |
| Crosslinking agent | Polymerizable Compound 10 | | | | | | | 23.6 | 27.24 |
| Crosslinking agent | Polymerizable Compound 12 | | | | | | | | |
| Crosslinking agent | Polymerizable Compound 13 | | | | | | | | |
| Crosslinking agent | EGDM | | | | | | | | |
| Crater preventive | Tego Glide 432 | 1.00 | 1.00 | 1.00 | 1.00 | 1.00 | 1.00 | 1.00 | 1.00 |
| Polymerization initiator | AIBN | | | | | | | | |
| Photopolymerization initiator | Darocur 1173 | 0.47 | 0.50 | 0.47 | 0.50 | 0.47 | 0.50 | 0.47 | 0.50 |

| | | Mass (g) | | | | | |
|---|---|---|---|---|---|---|---|
| | | Example 8 | | Example 9 | | Comparative example 2 | |
| Role | Abbreviation | anion | cation | anion | cation | anion | cation |
| Cationic monomer | 2-SEM | | | | | | 41.5 |
| Crosslinking agent | MBA | | | | | | |
| Crosslinking agent | Polymerizable Compound 7 | | | | | | |
| Crosslinking agent | Polymerizable Compound 8 | | | | | | |
| Crosslinking agent | Polymerizable Compound 9 | | | | | | |
| Crosslinking agent | Polymerizable Compound 10 | | | | | | |
| Crosslinking agent | Polymerizable Compound 12 | 22.64 | 28.3 | | | | |
| Crosslinking agent | Polymerizable Compound 13 | | | 22 | 25.44 | | |
| Crosslinking agent | EGDM | | | | | 18.10 | 18.20 |
| Crater preventive | Tego Glide 432 | 1.00 | 1.00 | 1.00 | 1.00 | | |
| Polymerization initiator | AIBN | | | | | 0.70 | 0.60 |
| Photopolymerization initiator | Darocur 1173 | 0.47 | 0.50 | 0.47 | 0.50 | | |

With regard to the anion exchange membranes and the cation exchange membranes prepared in Examples 1 to 9 and Comparative Example 1 and 2, the following items were evaluated. The thus obtained results are shown in Table 3 and Table 4 below.

Ionic selective permeability (ionic transport number) were calculated by measuring membrane potential (V) by measurement of static membrane potential. Two electrolytic cells (cells) were separated by a measured membrane. Before measurement, the membrane achieved equilibrium in a 0.05 M NaCl aqueous solution in approximately 16 hours. Then, NaCl aqueous solutions having different concentrations were poured into cells on a side facing with the measured membranes, respectively.

Into one cell, 100 mL of 0.05 M NaCl aqueous solution was poured. Into the other cell, 100 mL of 0.5 M NaCl aqueous solution was poured.

In a thermostatic bath, a temperature of the NaCl aqueous solution in the cell was stabilized at 25° C., and then while both liquids were flowed toward a membrane face, both electrolytic cells and an Ag/AgCl reference electrode (manufactured by Metrohm AG, Switzerland) were connected with a salt bridge to measure membrane potential (V), and ionic transport number t was calculated according to the following formula (a).

In addition, an effective area of the membrane was 1 cm².

$$t=(a+b)/2b \quad \text{Formula (a)}$$

A detail of each sign in the above-described formula (a) is shown below.

a: Membrane potential (V)
b: $0.5915 \log(f_1 c_1 / f_2 c_2)$ (V)
$f_1$ and $f_2$: NaCl activity coefficients in both cells
$c_1$ and $c_2$: NaCl concentrations (M) in both cells

[Water Permeability (mL/m²/Pa/Hr)]

Figure 2:
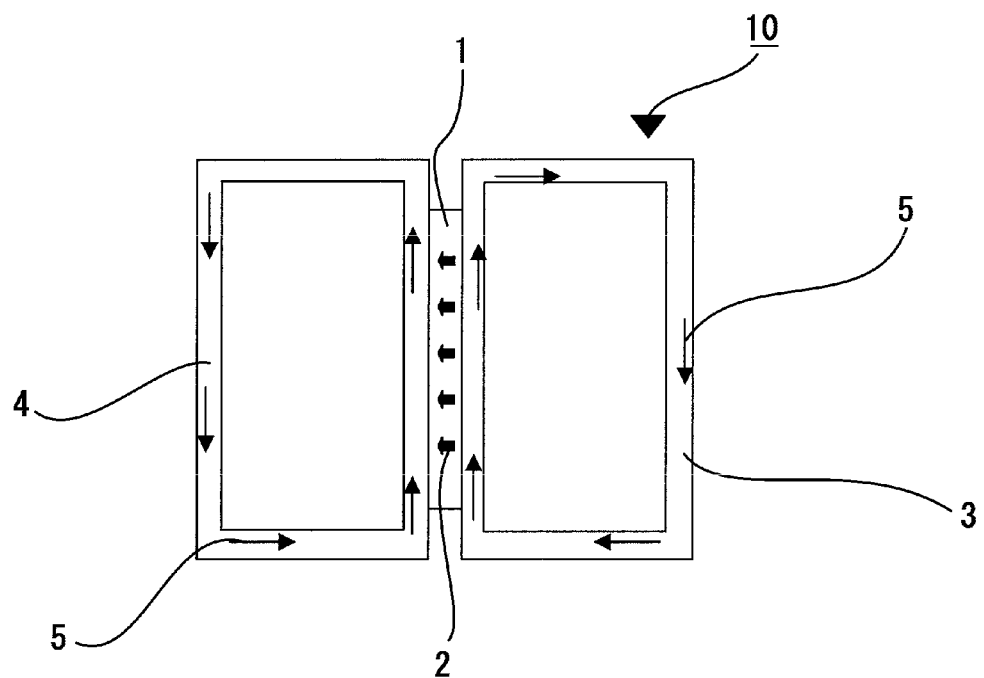
FIG. 2 schematically shows flow channels of a device for measuring water permeability of a membrane.

Water permeability of the membrane was measured using a device having a flow channel 10 shown in FIG. 1. In FIG. 2, sign 1 represents a membrane, and signs 3 and 4 represent flow channels of a feed solution (pure water) and a draw solution (3 M NaCl), respectively. An arrow of sign 2 shows a flow of water separated from the feed solution.

Through the membrane, 400 mL of feed solution and 400 mL of draw solution were brought into contact (membrane contact area 18 cm²), and each solution was allowed to flow at a rate of 8 cm/sec in a direction of an arrow of sign 5 using a Perista pump. A rate at which water in the feed solution permeates into the draw solution through the membrane was analyzed by measuring masses of the feed solution and the draw solution on a real time basis to determine the water permeability.

[Electrical Resistance of Membrane (Ω·cm²)]

Both sides of the membrane immersed into a 0.5 M NaCl aqueous solution for approximately 2 hours were wiped off using a dry filter paper, and the membrane was interposed between two chambers of a two-chamber cell (effective membrane area: 1 cm², platinum electrodes were used as electrodes). Both chambers were filled with 20 mL of 0.5 M NaCl aqueous solution and the cell was placed in a thermostatic water bath at 25° C., and allowed to stand until the cell reached equilibrium. A liquid temperature in the cell exactly reached 25° C., and then electrical resistance $r_1$ was measured using an alternative current bridge (frequency: 1,000 Hz).

Next, the membrane was removed, and the liquid was adjusted only to 0.5 M NaCl aqueous solution, and electrical resistance $r_2$ between both electrodes was measured to determine electrical resistance R ($\Omega \cdot cm^2$) from a difference: $r_1-r_2$.

In Tables 3 and 4 below, "electrical resistance of membrane" was abbreviated as "membrane resistance" and described.

[pH Tolerance]

Into a hydrochloric acid aqueous solution having pH 1, and a sodium hydroxide aqueous solution having pH 14, membranes were immersed and held at 40° C. for 3 hours, respectively. A ratio (holding ratio (%)) of water permeability of the membrane after immersion to water permeability of the membrane before immersion was calculated.

A case where the holding ratios of water permeability of the membrane before and after immersion into both of the hydrochloric acid aqueous solution having pH 1, and the sodium hydroxide aqueous solution having pH 14 was 90% or more was evaluated as "good," and a case where the holding ratio of water permeability of the membrane before and after immersion into any one of the solutions was less than 90% was evaluated as "poor."

TABLE 3

|  | Example 1 | | Example 2 | | Example 3 | | Comparative example 1 | |
| --- | --- | --- | --- | --- | --- | --- | --- | --- |
|  | Anion exchange membrane | Cation exchange membrane | Anion exchange membrane | Cation exchange membrane | Anion exchange membrane | Cation exchange membrane | Anion exchange membrane | Cation exchange membrane |
| Ionic transport number | 0.92 | 0.98 | 0.93 | 1 | 0.93 | 0.99 | 0.9 | 0.97 |
| Water permeability (mL/m$^2$/Pa/hr) | $12.6 \times 10^{-5}$ | $10.2 \times 10^{-5}$ | $9.4 \times 10^{-5}$ | $8.5 \times 10^{-5}$ | $7.8 \times 10^{-5}$ | $6.9 \times 10^{-5}$ | $17.2 \times 10^{-5}$ | $15 \times 10^{-5}$ |
| Membrane resistance ($\Omega \cdot cm^2$) | 1.3 | 2.4 | 1.4 | 2.5 | 1.5 | 2.6 | 1.2 | 2 |
| pH tolerance | Good | Good | Good | Good | Good | Good | Poor | Poor |

As is apparent from Table 3, all of the anion exchange membranes and the cation exchange membranes in Examples 1 to 3, in which the above-described polymerizable compound 1 represented by Formula (1) according the present invention were used, showed good results for all of the ionic transport number, the water permeability, the membrane resistance and the pH tolerance. In contrast, the anion exchange membrane and the cation exchange membrane in Comparative Example 1 in, which the cross-linking agent being the hitherto-known polymerizable compound was used, were inferior in the water permeability and the pH tolerance in comparison with the anion exchange membranes and the cation exchange membranes in Examples 1 to 3.

TABLE 4

|  | Example 4 | | Example 5 | | Example 6 | | Example 7 | |
| --- | --- | --- | --- | --- | --- | --- | --- | --- |
|  | anion | cation | anion | cation | anion | cation | anion | cation |
| Ionic transport number | 0.92 | 0.97 | 0.93 | 0.99 | 0.94 | 1 | 0.95 | 1.01 |
| Water permeability (mL/m$^2 \cdot$ Pa $\cdot$ hr) | $12.3 \times 10^{-5}$ | $10.8 \times 10^{-5}$ | $11.5 \times 10^{-5}$ | $10.3 \times 10^{-5}$ | $10.9 \times 10^{-5}$ | $9.6 \times 10^{-5}$ | $10.2 \times 10^{-5}$ | $9.01 \times 10^{-5}$ |
| pH tolerance | Good | Good | Good | Good | Good | Good | Good | Good |
| Membrane resistance ($\Omega \cdot cm^2$) | 1.3 | 2.2 | 1.4 | 2.3 | 1.4 | 1.5 | 1.5 | 1.6 |

|  | Example 8 | | Example 9 | | Comparative example 2 | |
| --- | --- | --- | --- | --- | --- | --- |
|  | anion | cation | anion | cation | anion | cation |
| Ionic transport number | 0.93 | 0.99 | 0.95 | 1.01 | 0.9 | 0.97 |
| Water permeability (mL/m$^2 \cdot$ Pa $\cdot$ hr) | $10.1 \times 10^{-5}$ | $9.4 \times 10^{-5}$ | $9.8 \times 10^{-5}$ | $8.48 \times 10^{-5}$ | $17.2 \times 10^{-5}$ | $15 \times 10^{-5}$ |
| pH tolerance | Good | Good | Good | Good | Poor | Poor |
| Membrane resistance ($\Omega \cdot cm^2$) | 1.5 | 2.3 | 2.5 | 2.8 | 1.2 | 2 |

As is apparent from Table 4, all of the anion exchange membranes and the cation exchange membranes in Examples 4 to 9, in which the above-described polymerizable compound represented by Formula (1) according to the present invention were used, showed good results for all of the ionic transport number, the water permeability, the membrane resistance and the pH tolerance. In contrast, the anion exchange membrane and the cation exchange membrane in Comparative Example 2, in which the cross-linking agent being the hitherto-known polymerizable compound was used, were inferior in the water permeability and the pH tolerance in comparison with the anion exchange membranes and the cation exchange membranes in Examples 4 to 9.

Having described our invention as related to the present embodiments, it is our intention that the invention not be limited by any of the details of the description, unless otherwise specified, but rather be construed broadly within its spirit and scope as set out in the accompanying claims.

REFERENCE SIGNS LIST

1 Membrane
2 Arrow showing that water in feed solution permeates into draw solution through membrane
3 Flow channel of feed solution
4 Flow channel of draw solution
5 Direction of movement of liquid
10 Flow channel in device for measuring water permeability

The invention claimed is:

1. A functional polymer membrane, prepared by curing a composition comprising a polymerizable compound (A) represented by Formula (1) and a monofunctional polymerizable compound (B):

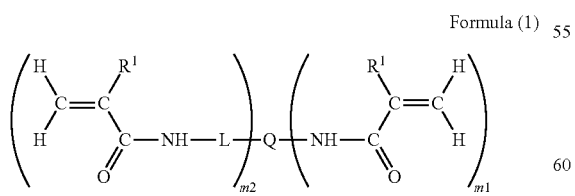

Formula (1)

wherein $R^1$ represents a hydrogen atom or a methyl group; Q represents a polyol residue formed by removing m2 hydrogen atoms from hydroxyl groups of a trivalent to hexavalent polyol; L represents a divalent linking group; m1 represents 0 or 1; m2 represents an integer of from 3 to 6; when m1 is 0, L represents —$CH_2CH_2CH_2$—; when m1 is 1, m2 is 3, Q represents a polyol residue formed by removing three hydrogen atoms from hydroxyl groups of a trivalent polyol *—$C(L^2$—$OH)_3$, and L represents —$(C_kH_{2k}O)_1$-$L^1$-; the symbol "*" represents a binding site to nitrogen atom of (meth)acrylamide; $L^2$ represents a divalent linking group; k represents 2 or 3; l represents an integer of from 0 to 6; $L^1$ represents a linear or branched alkylene group having 2 to 4 carbon atoms and bonded to the nitrogen atom of the (meth)acrylamide; in $L^1$, the oxygen atom and nitrogen atom bonded to both ends of $L^1$ do not bind to the same carbon atom of $L^1$; and the sum of the three l's satisfies from 0 to 18, and wherein the monofunctional polymerizable compound (B) is a (meth)acrylate compound, a (meth)acrylamide compound, a vinyl ether compound, an aromatic vinyl compound, an N-vinyl compound, or an allyl compound.

2. The functional polymer membrane according to claim 1, wherein the polymerizable compound (A) represented by Formula (1) is a polymerizable compound represented by Formula (2):

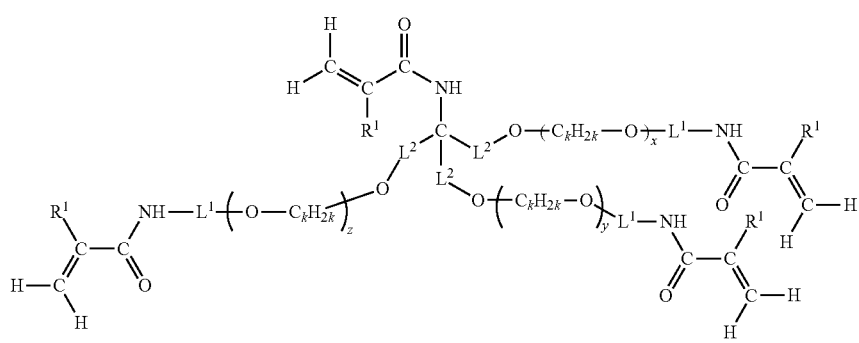

Formula (2)

wherein $R^1$ represents a hydrogen atom or a methyl group; $L^1$ represents a linear or branched alkylene group having 2 to 4 carbon atoms; in $L^1$, the oxygen atom and nitrogen atom bonded to both ends of $L^1$ do not bind to the same carbon atom of $L^1$; $L^2$ represents a divalent linking group; k represents 2 or 3; x, y and z each independently represent an integer of from 0 to 6; and (x+y+z) satisfies from 0 to 18.

3. The functional polymer membrane according to claim 1, wherein the polymerizable compound (A) represented by Formula (1) is a polymerizable compound represented by Formula (3):

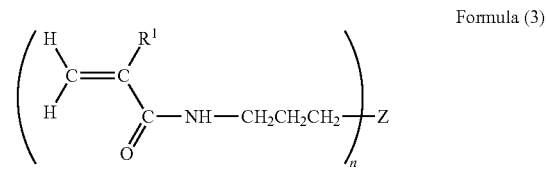

Formula (3)

wherein $R^1$ represents a hydrogen atom or a methyl group; Z represents a polyol residue formed by removing n hydrogen atoms from hydroxyl groups of a trivalent to hexavalent polyol; and n represents an integer of from 3 to 6.

4. The functional polymer membrane according to claim 3, wherein Z in Formula (3) represents a polyol residue formed by removing n hydrogen atoms from hydroxyl groups of glycerin, erythritol, xylitol, mannitol, sorbitol, pentaerythritol or dipentaerythritol.

5. The functional polymer membrane according to claim 1, wherein the copolymerizable monomer (B) has a dissociative group.

6. The functional polymer membrane according to claim 5, wherein the dissociative group is selected from the group consisting of a sulfo group or a salt thereof, a carboxy group or a salt thereof, an ammonio group and a pyridinio group.

7. The functional polymer membrane according to claim 1, wherein the copolymerizable monomer (B) is a (meth) acrylate compound or a (meth)acrylamide compound.

8. The functional polymer membrane according to claim 3, wherein a content of the polymerizable compound (A) represented by Formula (3) in the composition is 1 to 40% by mass.

9. The functional polymer membrane according to claim 2, wherein a content of the polymerizable compound (A) represented by Formula (2) is 1 to 45 parts by mass based on 100 parts by mass of the monofunctional polymerizable compound (B).

10. The functional polymer membrane according to claim 3, wherein a content of the polymerizable compound (A) represented by Formula (3) is 10 to 200 parts by mass based on 100 parts by mass of the monofunctional polymerizable compound (B).

11. The functional polymer membrane according to claim 1, wherein the composition contains a solvent (E).

12. The functional polymer membrane according to claim 11, wherein the solvent (E) is selected from water and a water-soluble solvent.

13. The functional polymer membrane according to claim 11, wherein a content of the solvent (E) in the composition is 10 to 50% by mass.

14. The functional polymer membrane according to claim 1, which contains a support.

15. The functional polymer membrane according to claim 13, prepared by curing the composition after being impregnated into the support.

16. The functional polymer membrane according to claim 1, wherein the functional polymer membrane is an ion exchange membrane, a reverse osmosis membrane, a forward osmosis membrane, or a gas separation membrane.

17. A method of producing a functional polymer membrane, comprising the step of: irradiating a composition containing a polymerizable compound (A) represented by Formula (1) and a monofunctional polymerizable compound (B) with an energy ray thereby polymerizing the composition:

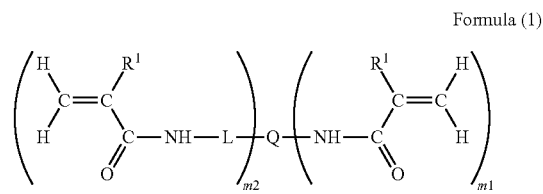

Formula (1)

wherein $R^1$ represents a hydrogen atom or a methyl group; Q represents a polyol residue formed by removing m2 hydrogen atoms from hydroxyl groups of a trivalent to hexavalent polyol; L represents a divalent linking group; m1 represents 0 or 1; m2 represents an integer of from 3 to 6; when m1 is 0, L represents —$CH_2CH_2CH_2$—; when m1 is 1, m2 is 3, Q represents a polyol residue formed by removing three hydrogen atoms from hydroxyl groups of a trivalent polyol *—$C(L^2$—$OH)_3$, and L represents —$(C_kH_{2k}O)_1$—$L^1$-; the symbol "*" represents a binding site to nitrogen atom of (meth)acrylamide; $L^2$ represents a divalent linking group; k represents 2 or 3; l represents an integer of from 0 to 6; $L^1$ represents a linear or branched alkylene group having 2 to 4 carbon atoms and bonded to the nitrogen atom of the (meth)acrylamide; in $L^1$, the oxygen atom and nitrogen atom bonded to both ends of $L^1$ do not bind to the same carbon atom of $L^1$; and the sum of the three l's satisfies from 0 to 18, and wherein, the monofunctional polymerizable compound (B) is a (meth)acrylate compound, a (meth)acrylamide compound, a vinyl ether compound, an aromatic vinyl compound, an N-vinyl compound, or an allyl compound.

18. The method of producing a functional polymer membrane according to claim 17, wherein the polymerizable compound represented by Formula (1) is a polymerizable compound represented by Formula (2):

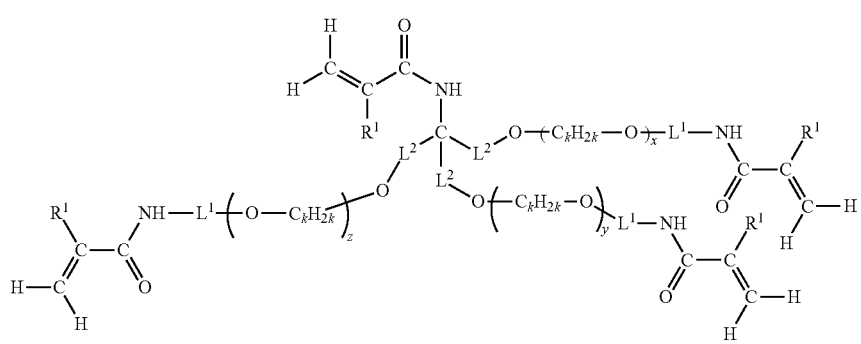

Formula (2)

wherein $R^1$ represents a hydrogen atom or a methyl group; $L^1$ represents a linear or branched alkylene group having 2 to 4 carbon atoms; in $L^1$, the oxygen atom and nitrogen atom bonded to both ends of $L^1$ do not bind to the same carbon atom of $L^1$; $L^2$ represents a divalent linking group; k represents 2 or 3; x, y and z each independently represent an integer of from 0 to 6; and (x+y+z) satisfies from 0 to 18.

19. The method of producing a functional polymer membrane according to claim 17, wherein the polymerizable compound (A) represented by Formula (1) is a polymerizable compound represented by Formula (3):

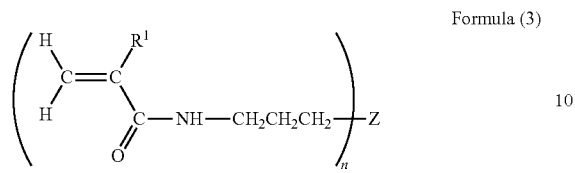

Formula (3)

wherein $R^1$ represents a hydrogen atom or a methyl group; Z represents a polyol residue formed by removing n hydrogen atoms from hydroxyl groups of a trivalent to hexavalent polyol; and n represents an integer of from 3 to 6.

* * * * *